INVENTORS
ALBERT J. DEIRY
BY HARRY E. CULLEN

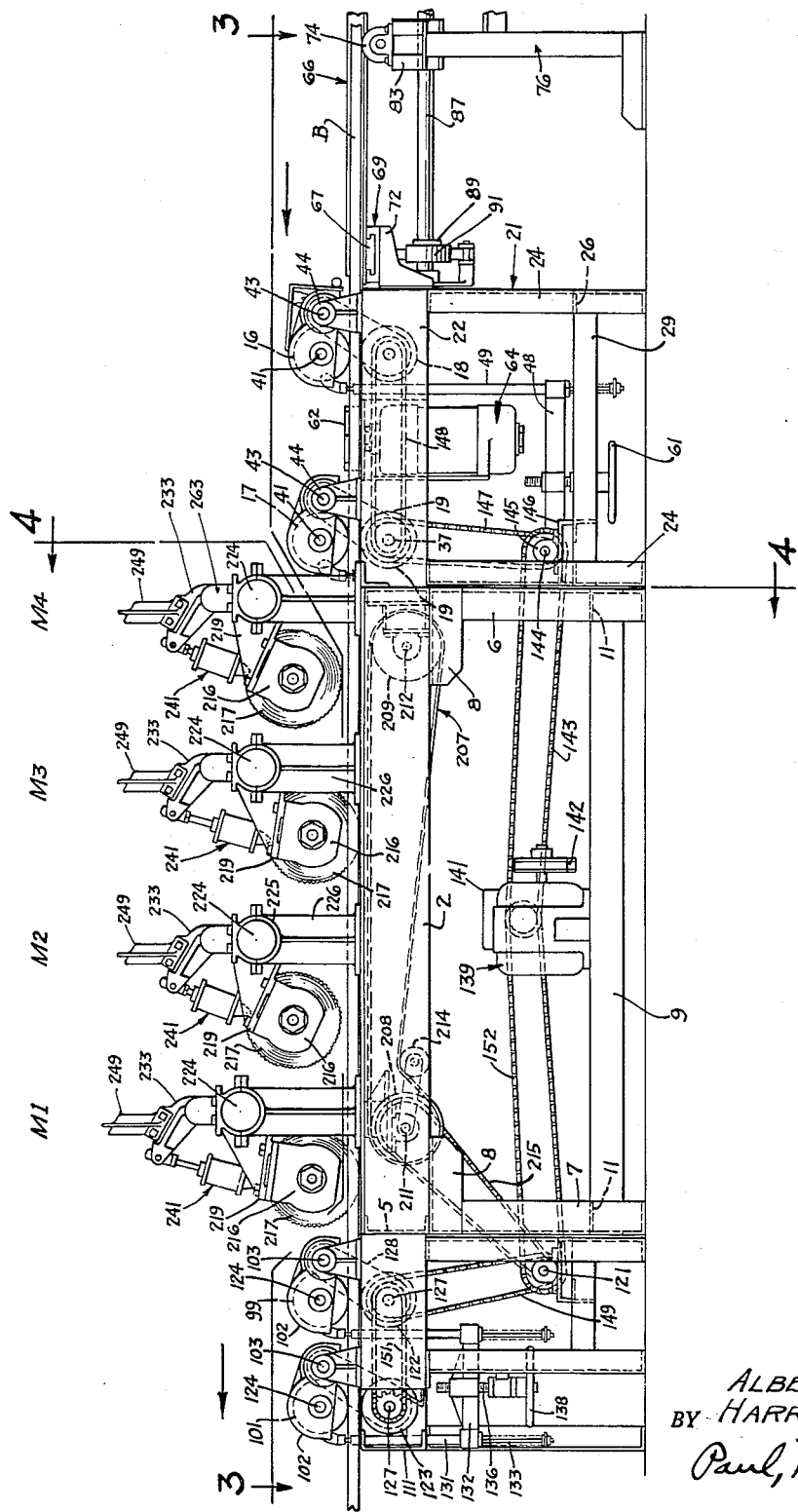

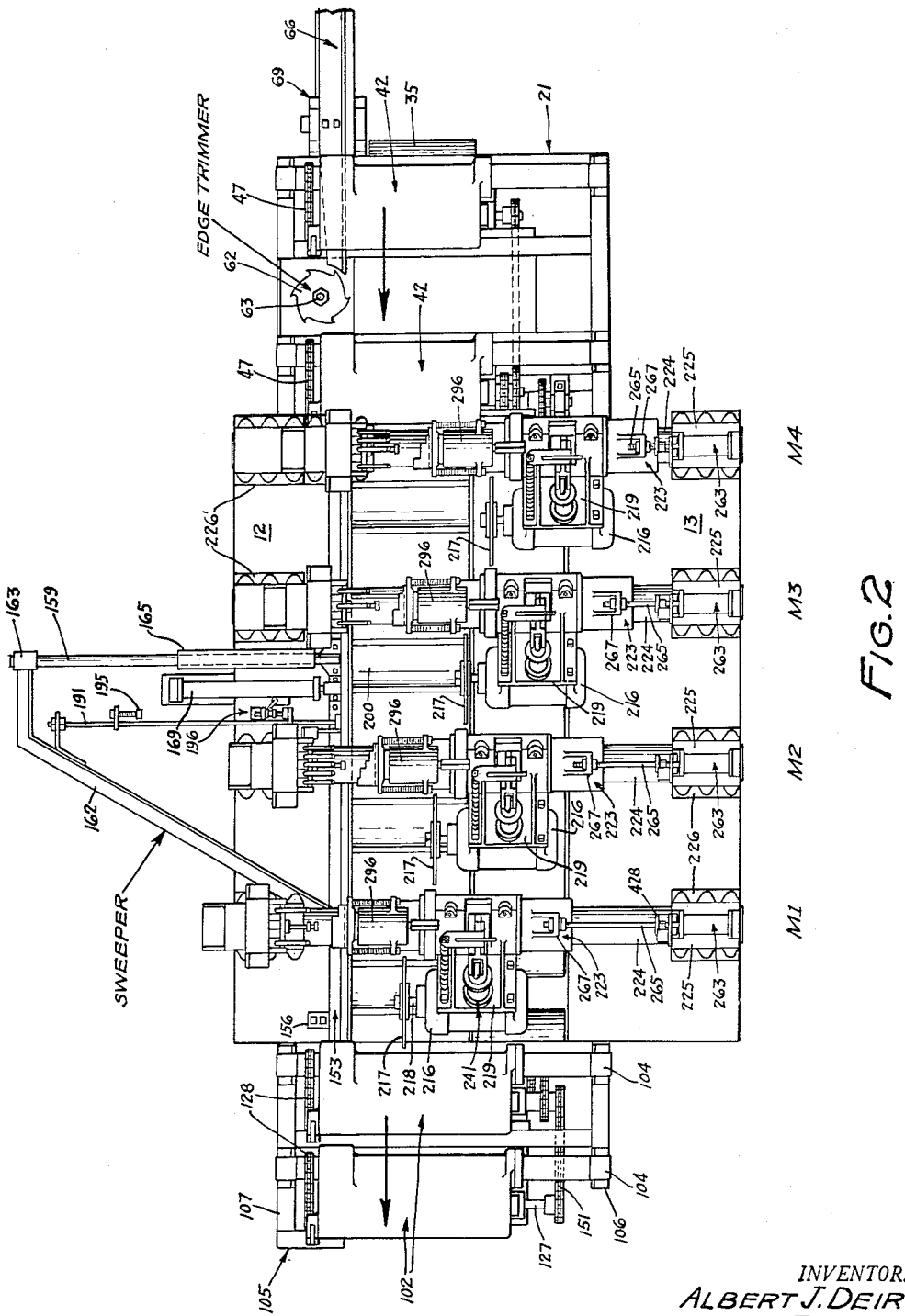

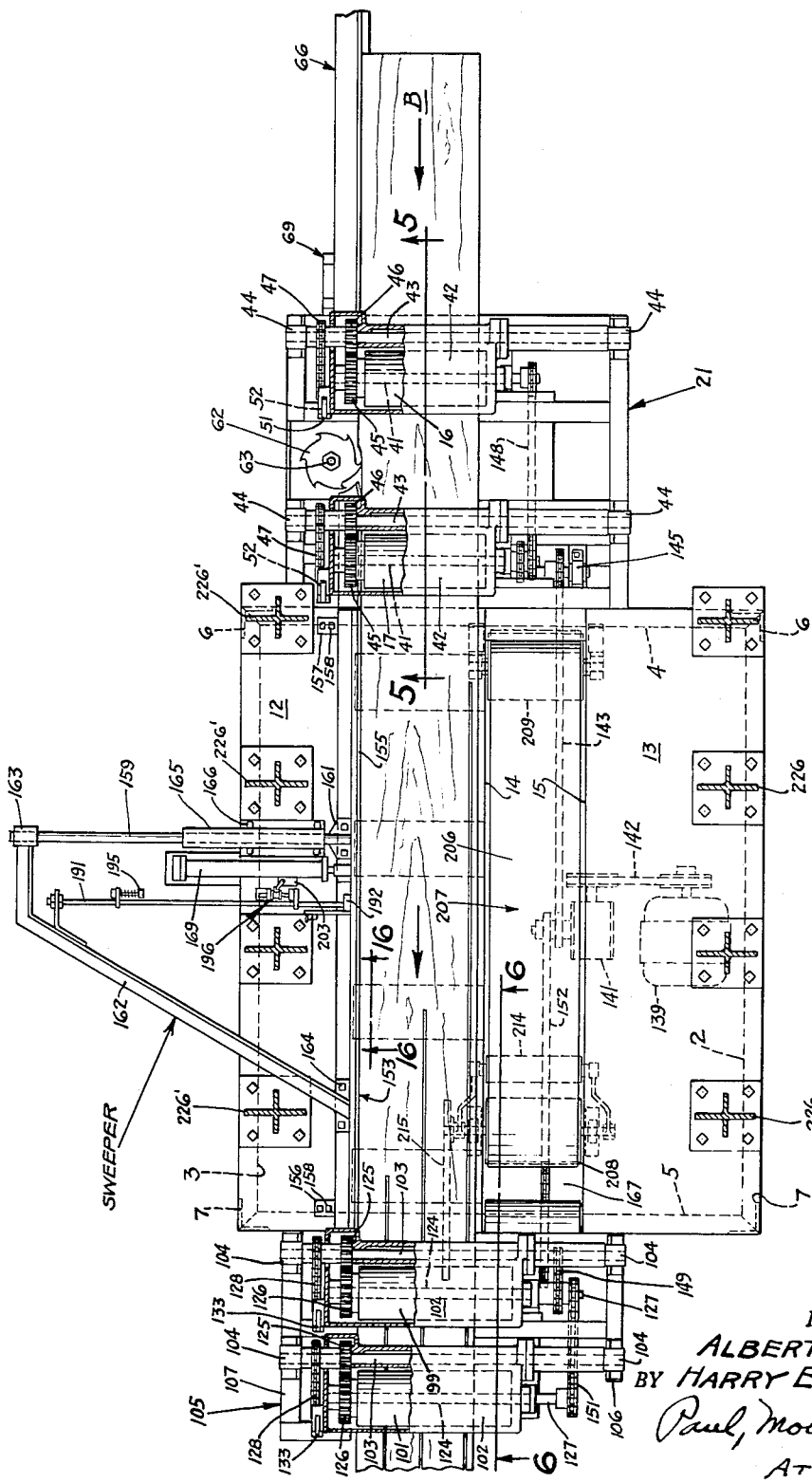

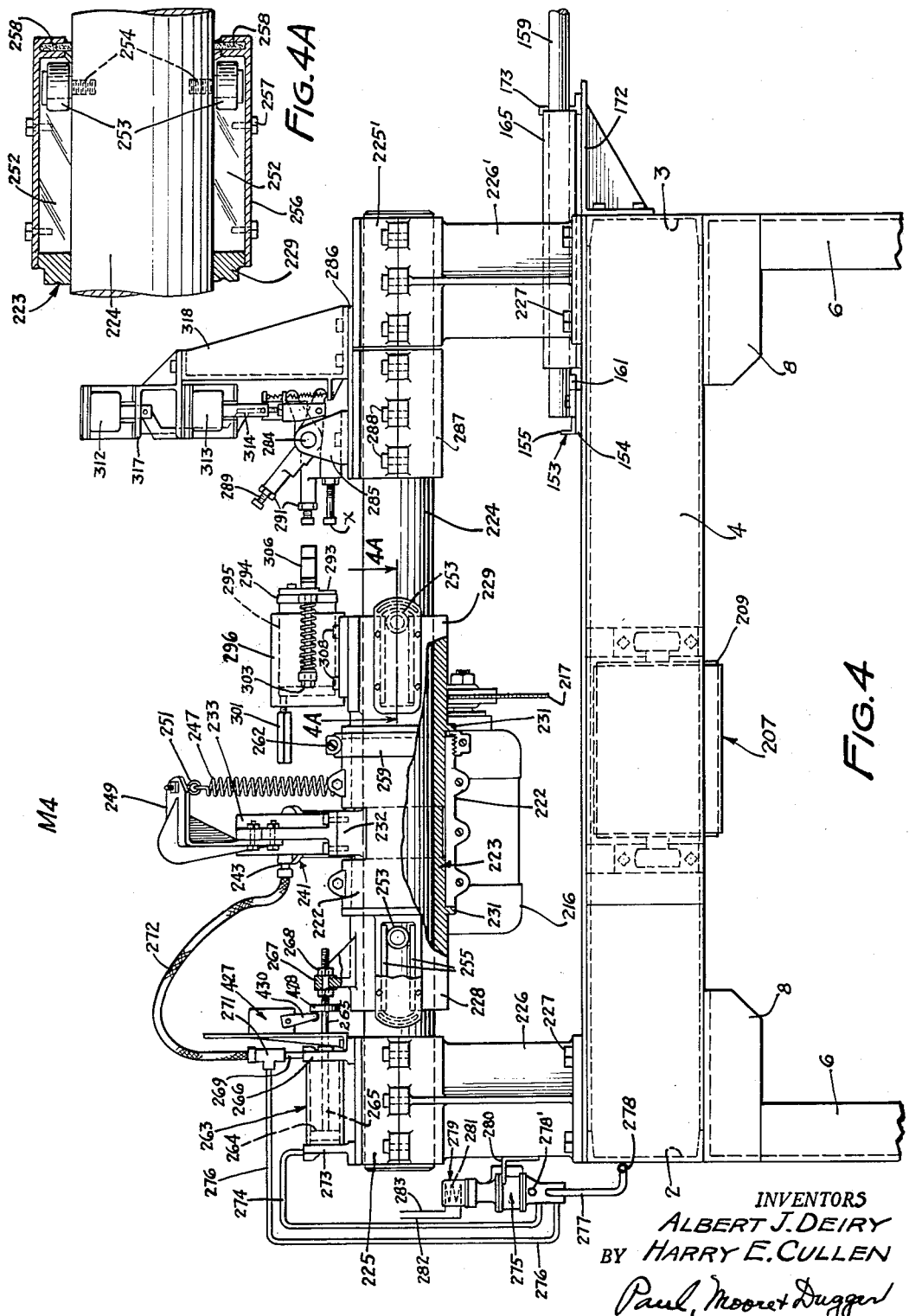

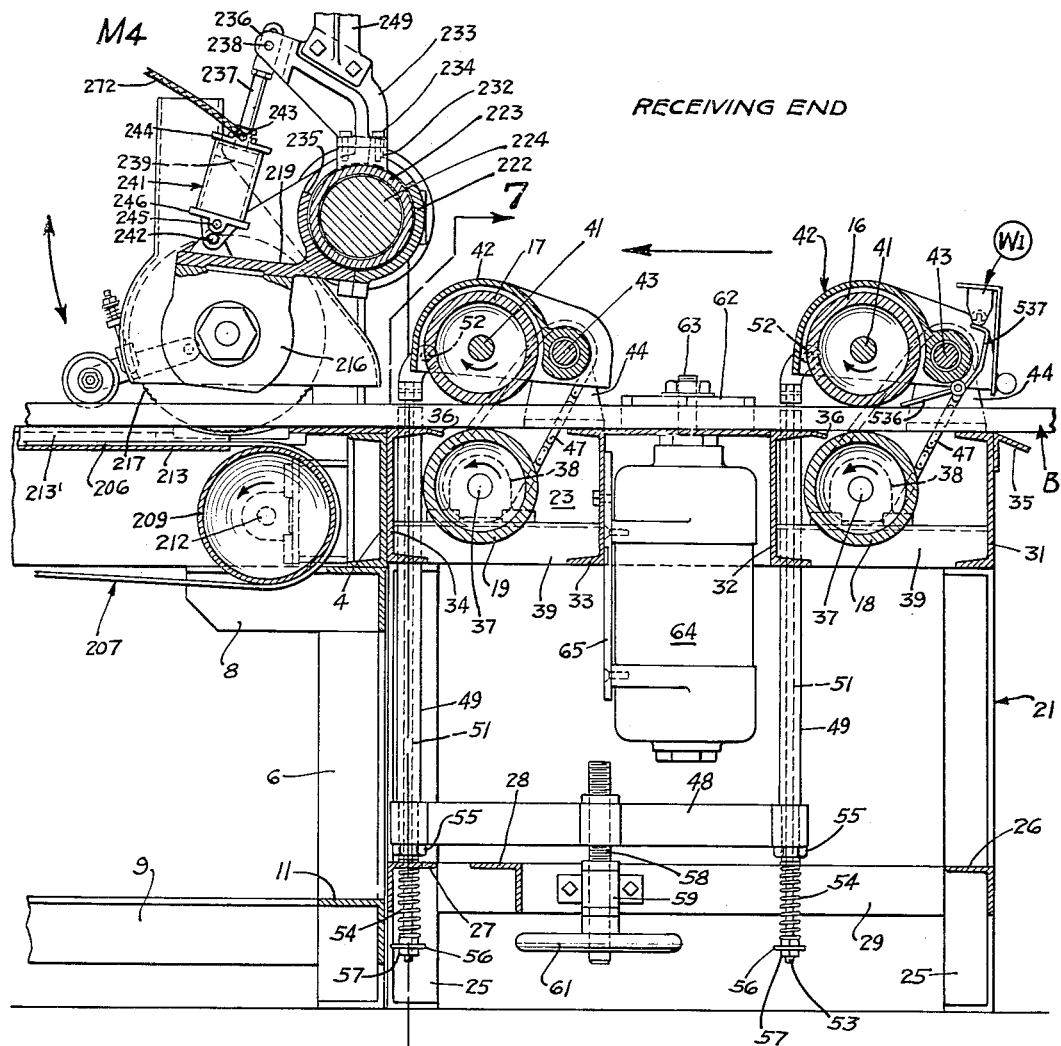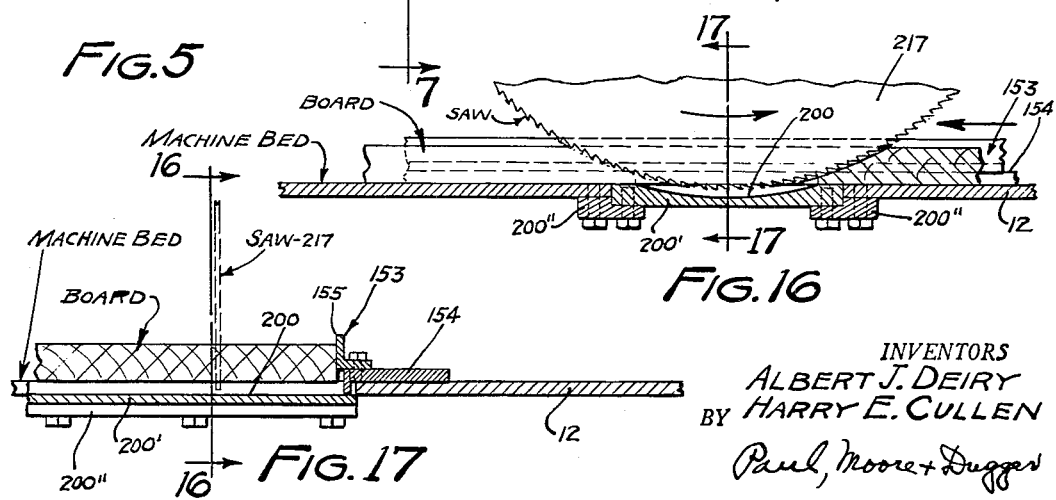

Paul, Moore + Dagger

ATTORNEYS

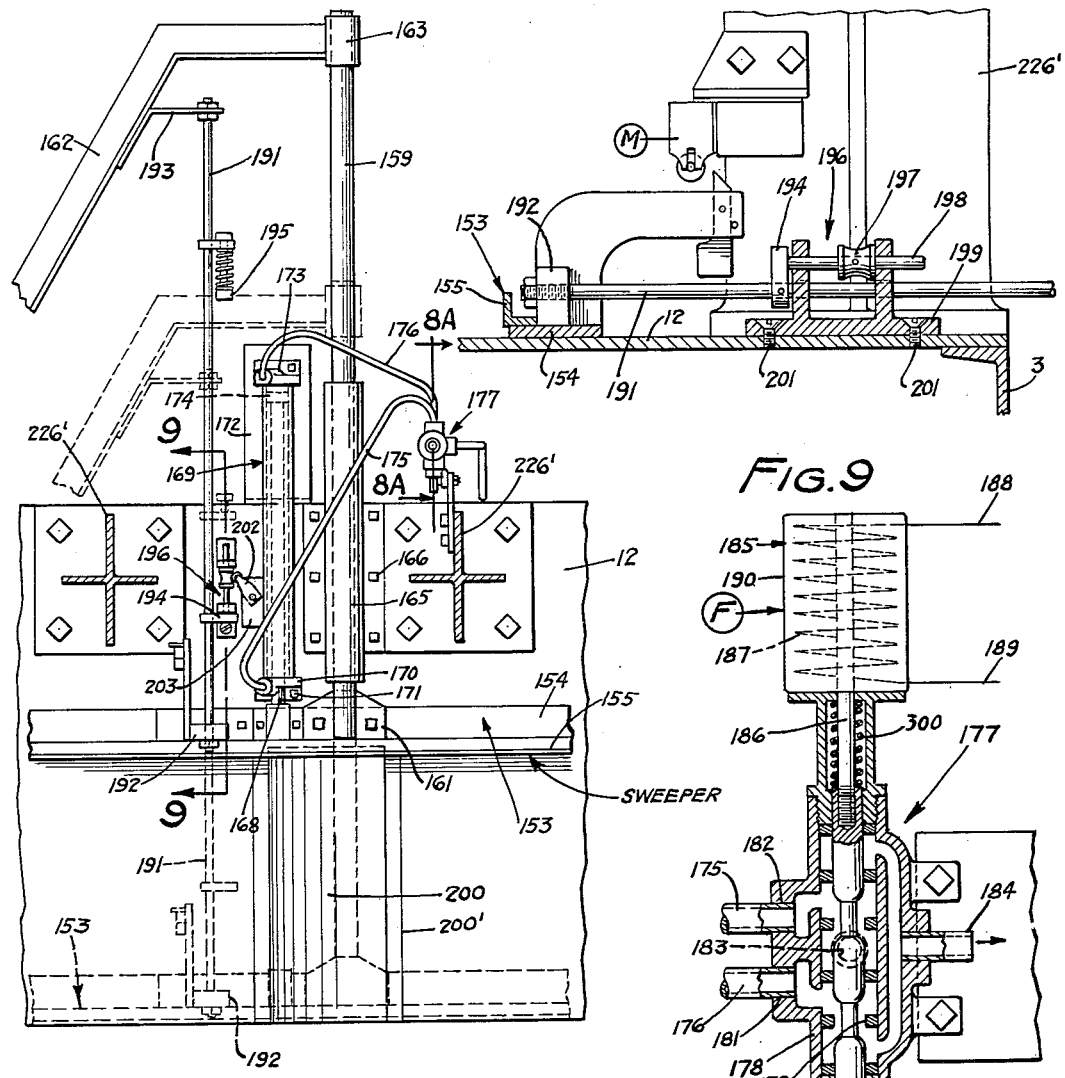

INVENTORS
ALBERT J. DEIRY
BY HARRY E. CULLEN

Paul, Moore + Duggan
ATTORNEYS

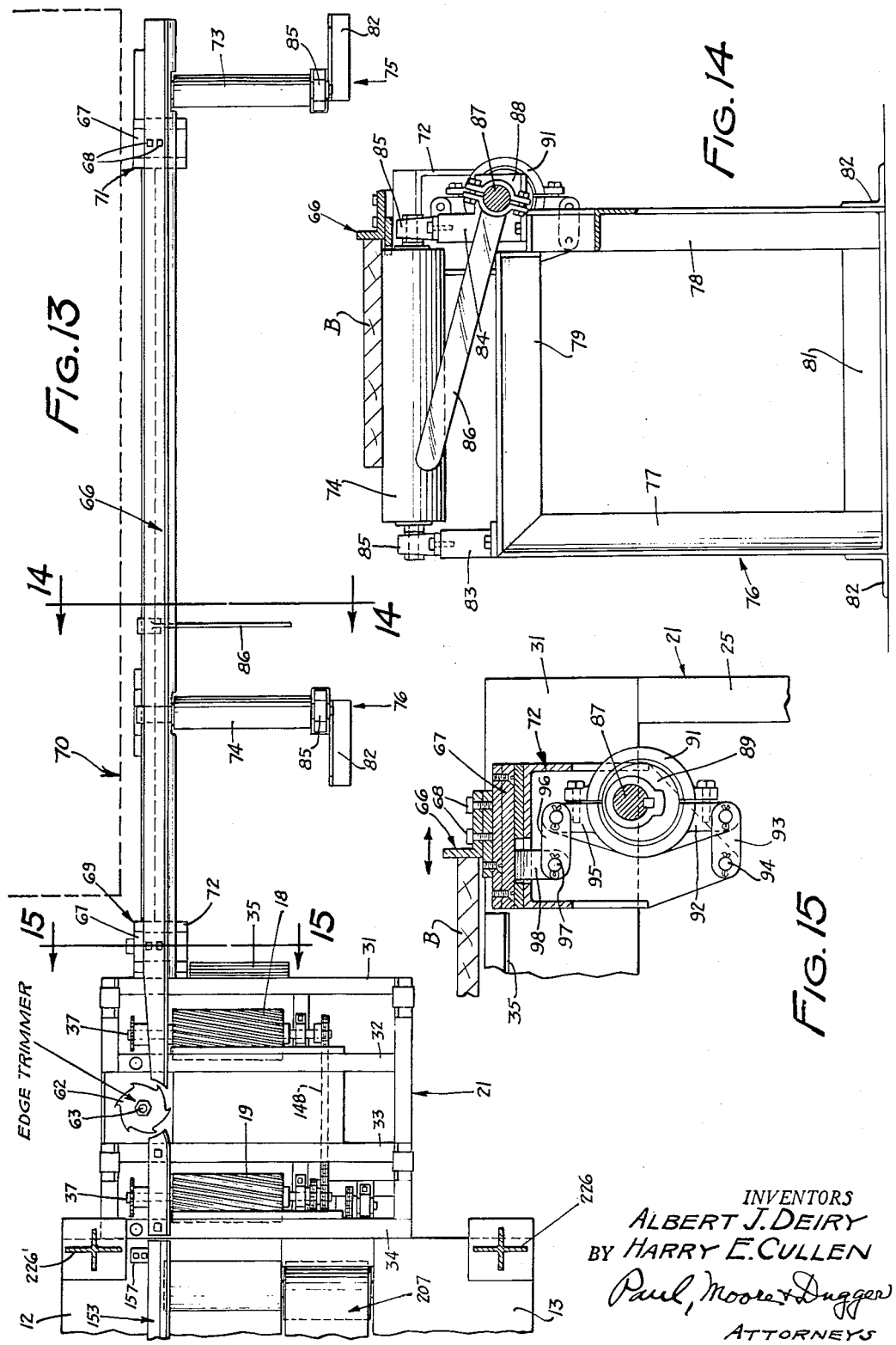

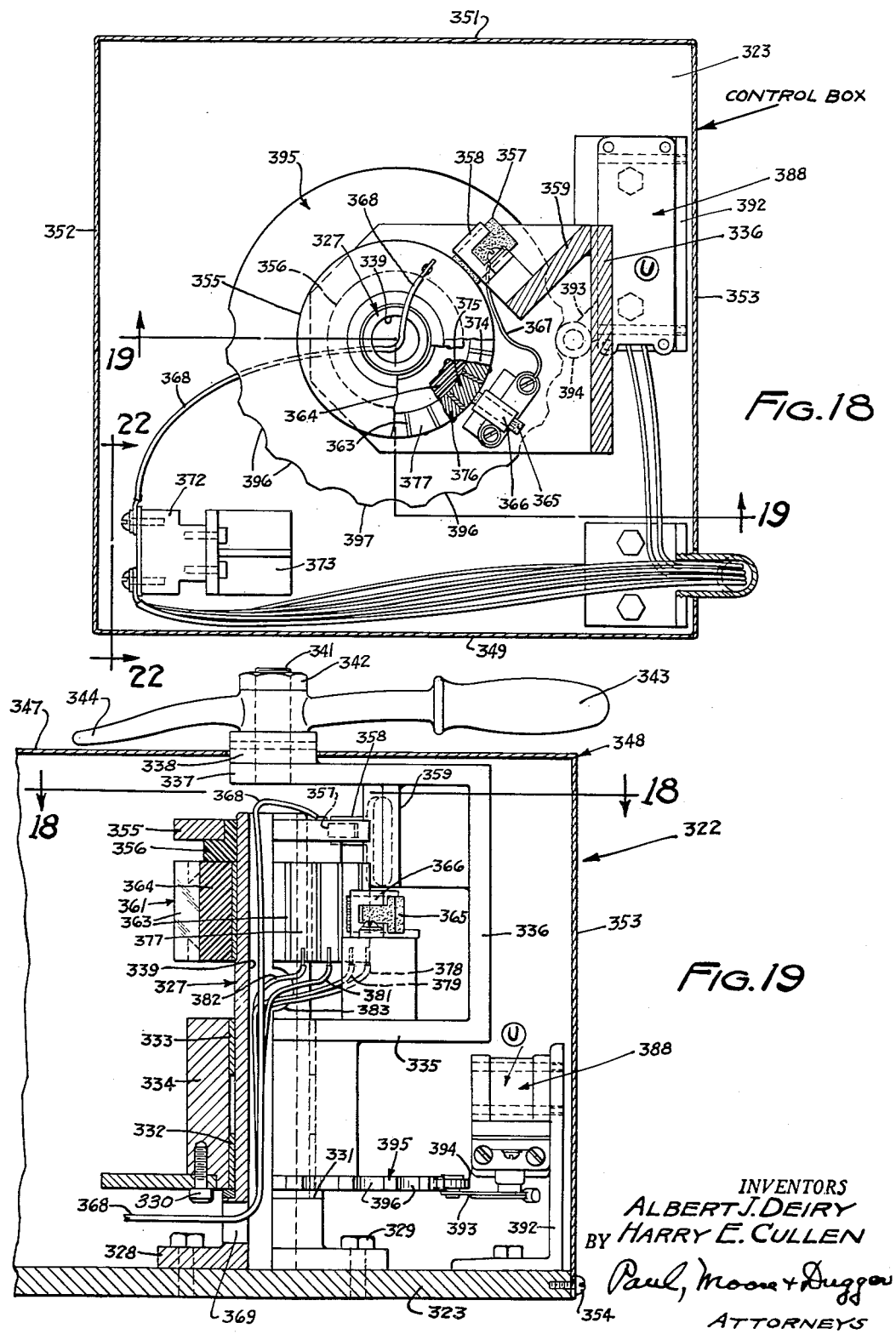

May 15, 1956   A. J. DEIRY ET AL   2,745,446
QUICKLY ADJUSTABLE MACHINE FOR RIPPING
LUMBER INTO SELECTED WIDTHS
Filed July 30, 1952   15 Sheets-Sheet 12

INVENTORS
ALBERT J. DEIRY
BY HARRY E. CULLEN
Paul, Moore + Dugger
ATTORNEYS

INVENTORS
ALBERT J. DEIRY
HARRY E. CULLEN
BY
ATTORNEYS

United States Patent Office 2,745,446
Patented May 15, 1956

2,745,446

QUICKLY ADJUSTABLE MACHINE FOR RIPPING LUMBER INTO SELECTED WIDTHS

Albert J. Deiry and Harry E. Cullen, Minneapolis, Minn., assignors to Wabash Screen Door Company, Minneapolis, Minn., a corporation of Minnesota Application July 30, 1952, Serial No. 301,662

23 Claims. (Cl. 143—37)

This invention relates to new and useful improvements in machines designed primarily for cutting or ripping boards into strips of predetermined widths, such as may subsequently be used in the manufacture of wooden screen and window frames, or other articles to be made from strip lumber.

In the manufacture of wooden screen and sash frames, the strips of lumber to be utilized in the construction of such frames are usually cut to predetermined sizes or widths from relatively wider boards, after which such strips are processed to prepare them for assembling into completed screen and sash frames. The present invention makes it possible to expeditiously longitudinally rip comparatively wide boards into a plurality of strips of predetermined widths such as required for the manufacture of screen and window frames subsequently to be made therefrom, and whereby said strips will require a minimum of dressing or sizing prior to being processed into screen or window frames, or other aritcles to be made therefrom.

An important object of the present invention therefore is to provide a machine for ripping boards into a plurality of strips of predetermined widths, comprising a plurality of saw heads mounted for lateral and vertical movements over the bed of the machine and controlled by manually operable means located convenient to the operators station at the receiving end of the machine, whereby the operator, when he has determined the number of strips to be cut from each board to be fed into the machine, may quickly and conveniently manipulate said control means and cause a predetermined number of saw heads to automatically move into selected cutting positions over the travel path of the board, and into cutting engagement with the board as it travels through the machine, whereby each board will be longitudinally cut or ripped into two or more strips, depending upon the width of the board and the number of strips to be cut therefrom.

A further object of the invention is to provide a lumber-ripping machine comprising a plurality of saw heads having independent motors, and a plurality of stop elements being associated with each saw head for limiting the lateral movement thereof in accordance with the number and widths of the strips to be cut from each board, said limit stops being automatically movable into and out of operative positions by a plurality of electrically operated devices which are interconnected with manually operable means, whereby the operator, after determining the number and size of the strips to be cut from each board, may quickly manipulate said control means and cause said limit stops to move into operative positions to be engaged by means carried by each saw head, thereby to limit the lateral movement of each saw head in accordance with the selection made by the operator prior to feeding the boards into the machine.

A further object is to provide a ripping machine of the class described wherein the lateral shifting of the saw heads over the machine bed is accomplished by pneumatic means, comprising a plurality of solenoid-actuated control valves which are interconnected with the manually operable control means to effect lateral shifting of the saw heads to selected positions, each time the operator manipulates the control means and a board is fed into the machine.

A further object is to provide a lumber-ripping machine comprising an ejector bar or sweeper mounted for traveling movement crosswise of the machine bed following each ripping operation, thereby to eject or remove from the machine bed sawdust and pieces of wood or debris remaining thereon, following each ripping operation.

A further object is to provide a machine of the class described having means at its receiving and discharge ends positioned to be engaged by each board fed into the machine cooperating to assure uninterrupted operation of the saw heads during each cycle of operation.

A further object of the invention is to provide a machine for trimming and ripping lumber comprising a plurality of operating mechanisms and control devices, interconnected with a single control element which must be manually actuated by the operator each time a board is fed into the machine which may require a different setting of the saw heads than that required by a preceding board, thereby to condition the various mechanisms for automatic operation each time a board is fed into the machine, and whereby boards may be successively fed into the machine by a single operator in rapid succession.

A further and more specific object of the invention is to provide a lumber-ripping machine of the class described, wherein fluid-operated means is provided for shifting the saw heads into and out of lumber-ripping positions over the machine bed, the operations of said fluid-operated means being effected by a plurality of electrical devices comprising a manually operable control lever adapted to be operated by an attendant or operator in accordance with the number of strips to be cut from each board, said saw heads automatically returning to their normal inoperative positions following the termination of each cycle of operation.

Other objects of the invention resides in the provision of a conveyor for receiving the trimmings and waste from the machine bed and delivering it into a suitable receiving means for proper disposal; in the arrangement of the tandem feed rolls, provided at the receiving end of the machine for engaging and positively feeding each board into the machine; in the provision of a vertically disposed edge trimmer between said tandem feed rolls adapted to engage, trim and square one edge of each board delivered into the machine before said board is longitudinally ripped into two or more strips by engagement with the saw heads mounted over the machine bed; in the unique arrangement of the rolls provided at the discharge end of the machine which engage the strips of lumber and feed them from the machine onto a suitable receiving table, from whence the strips may readily and conveniently be removed and placed onto a longitudinally extending conveyor, in spaced relation for further processing; in the unique arrangement and interconnecting of the various electrically and pneumatically operated control devices for automatically synchronizing the operations of the various mechanisms of the machine in accordance with the manual positioning of the control element of the apparatus by the operator, each time he inserts a board into the machine; and in the provision of such a machine which may be operated for long periods without interruption to expeditiously and efficiently longitudinally rip relatively wide boards into two or more strips of predetermined widths with the assurance that all such strips will be straight and their opposed edges square to the planes of said strips.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevation of the improved lumber-ripping machine herein disclosed, showing two of the saws in lumber-ripping positions;

Figure 2 is a plan view of Figure 1, showing the staggered relation of the various saw heads;

Figure 3 is a sectional plan view substantially on the line 3—3 of Figure 1, showing the sweeper in its normal position, and also showing the endless belt for receiving sawdust and other debris removed from the machine bed;

Figure 4 is a cross-sectional view on the line 4—4 of Figure 1, showing the means for shifting the saw heads into and out of their operative positions over the machine bed, and also showing the stop elements for limiting the forward movements of the saw heads;

Figure 4A is an enlarged detail sectional view on the line 4A—4A of Figure 4, showing the guide means provided on the cylindrical supporting members for the saw heads to prevent relative rotation of the saw head supporting sleeves thereon;

Figure 5 is a detail sectional view on the line 5—5 of Figure 3, showing the feed rolls at the receiving end of the machine;

Figure 8 is an enlarged fragmentary view showing the operating means for the sweeper;

Figure 8A is an enlarged detail sectional view on the line 8A—8A of Figure 8, showing the electrically operated fluid control valve for the sweeper;

Figure 9 is an enlarged detail sectional view on the line 9—9 of Figure 8;

Figure 13 is a plan view of the receiving end of the machine showing the longitudinally spaced idler rollers provided adjacent to a lumber rack for successively receiving the boards therefrom preparatory to feeding them into engagement with the feed rolls and edge trimmer of the machine;

Figure 14 is an enlarged cross-sectional view on the line 14—14 of Figure 13, showing the hand lever for laterally adjusting the lumber guide member;

Figure 15 is a fragmentary sectional view on the line 15—15 of Figure 13, showing the eccentric means provided in conjunction with the hand lever for laterally adjusting the guide member;

Figure 16 (Sheet 5) is a fragmentary detail sectional view on the line 16—16 of Figures 2 and 17, showing one of the transversely disposed recesses in the machine bed for receiving the peripheries of the saws to assure that the saws will cut through each board;

Figure 17 is a detail sectional view on the line 17—17 of Figure 16;

Figure 20:
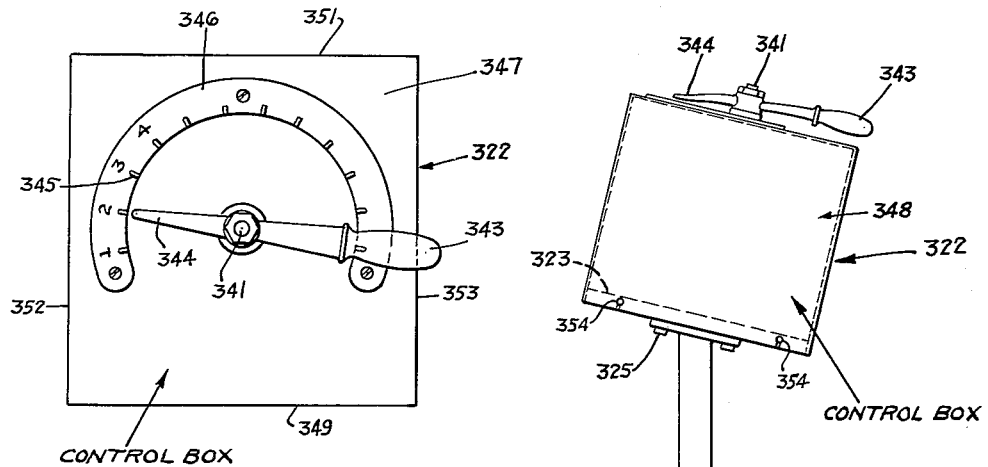
Figure 21:
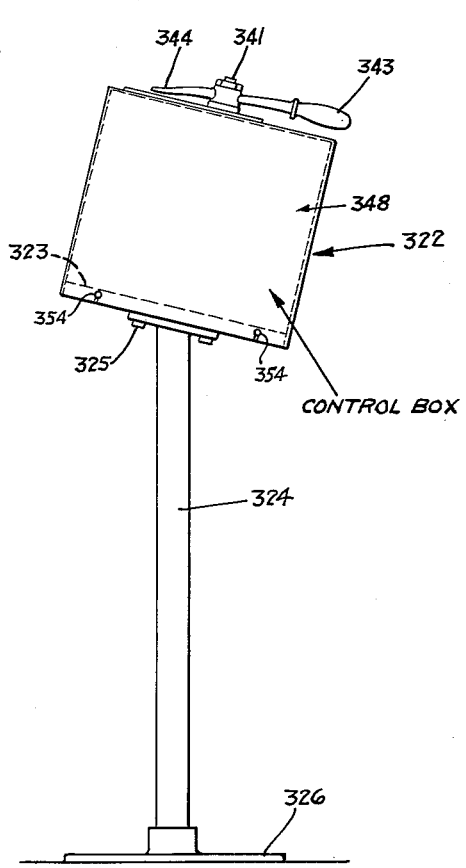
Figure 22:
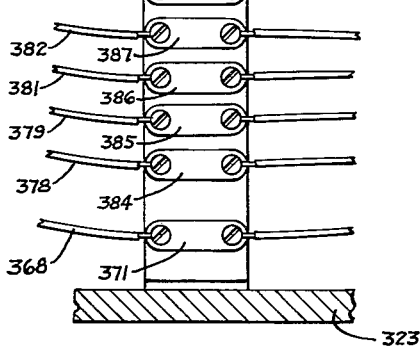
Figure 23:
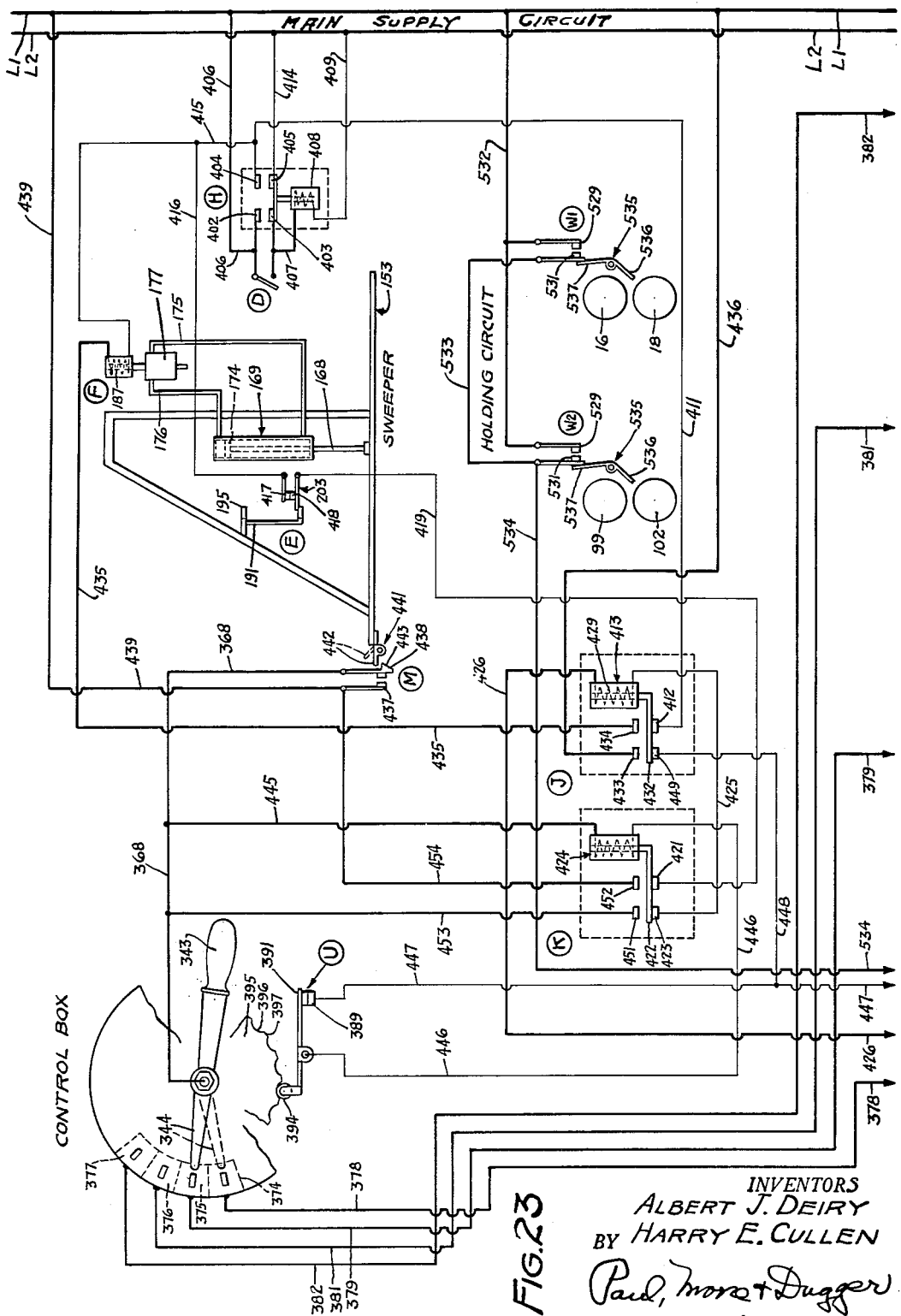
Figure 24:
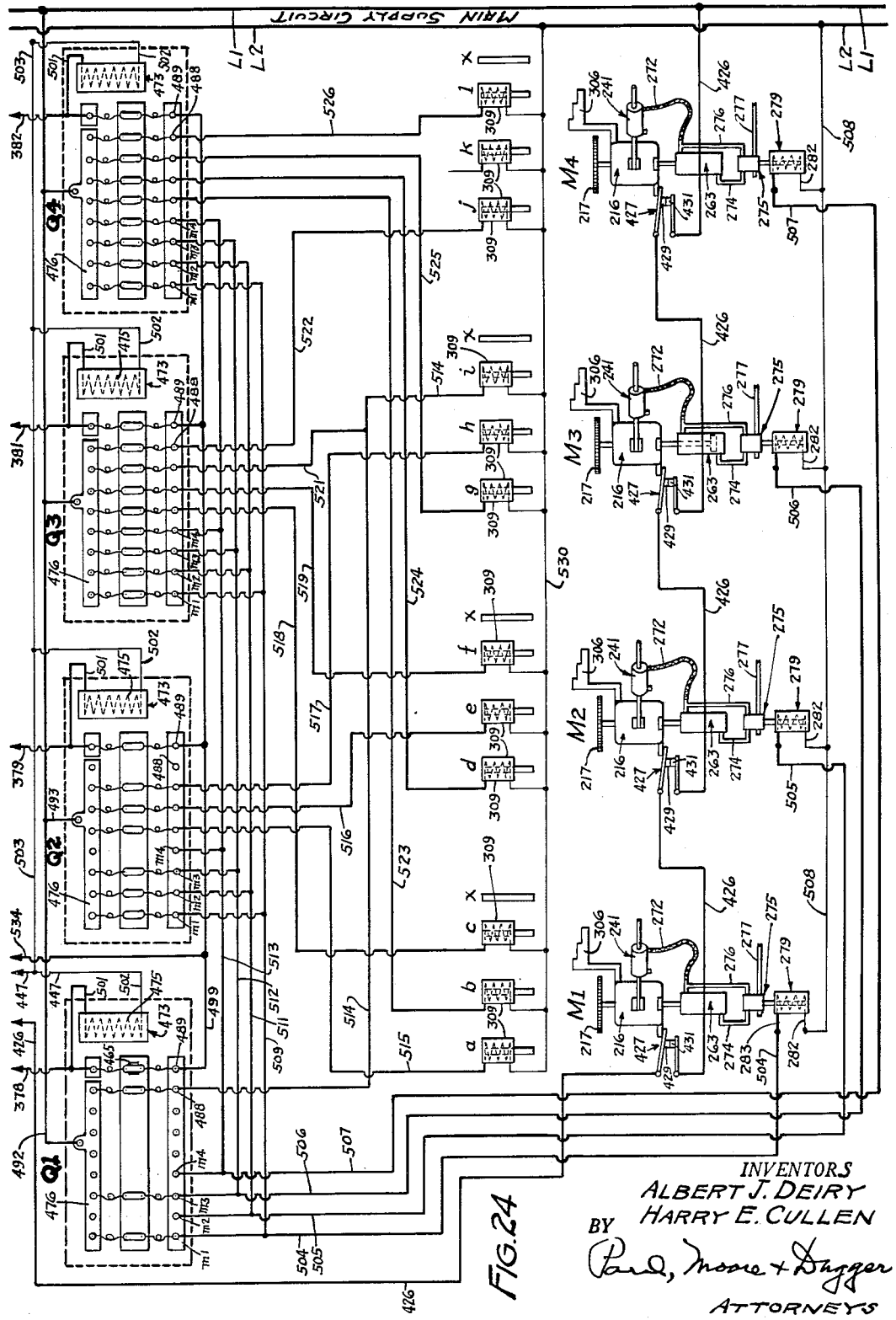
Figure 25:
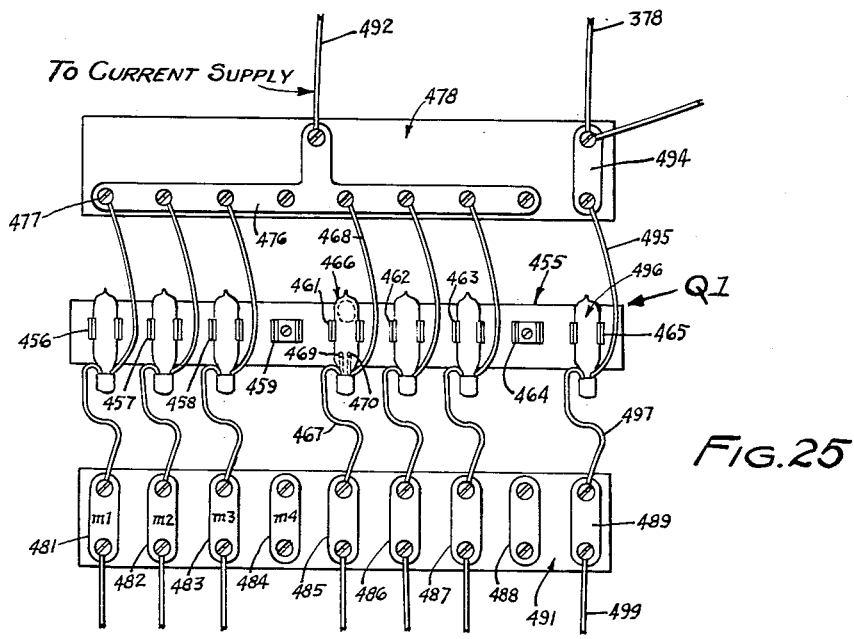
Figure 26:
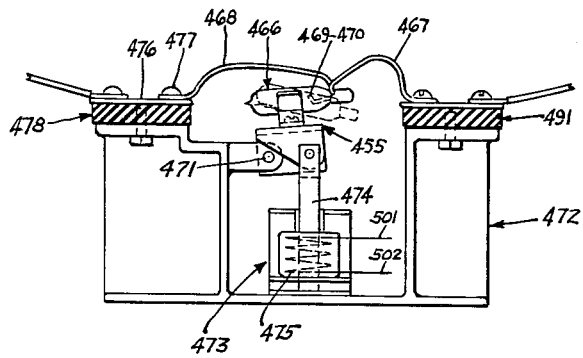

Figure 18 (Sheet 11) is a sectional plan view substantially on the line 18—18 of Figure 19, showing the contact ring and commutator and their respective brushes located within the control box, and also showing the circuit-breaker switch provided therein for automatically interrupting the flow of current to the circuit-closers, each time the control lever is moved from one lumber-ripping combination to another;

Figure 19 is a sectional elevation on the line 19—19 of Figure 18, showing the vertical relationship between the various operating elements provided within the control box, and also showing the control lever;

Figure 20 is a plan view of the control box, on a smaller scale, showing the control lever and the means provided on the control box for indicating the various lumber-ripping combinations or positions for the control lever;

Figure 21 is a side view of the control box showing it mounted upon a supporting pedestal;

Figure 22 is a fragmentary detail sectional view on the line 22—22 of Figure 18, showing the contact clip supporting member or bar provided within the control box to facilitate making the necessary electrical connections within the control box to provide the desired number of lumber-ripping combinations;

Figures 23 and 24 constitute a wiring diagram showing the electrical connections between the various electrical devices required in the control mechanism of the machine to produce the desired results;

Figure 25 is an enlarged view schematically showing a portion of a circuit-closer, one such device being required for each lumber-ripping combination; and Figure 26 is a detail sectional view showing the solenoid for automatically tilting the mercury switches into circuit-closing positions, when the circuit-closer of a given lumber-ripping combination is energized by manipulation of the control lever.

*Main supporting frame*

The main supporting frame of the novel machine herein disclosed is best illustrated in Figures 1 to 4, inclusive, and is preferably constructed of structural steel, although in some instances, portions thereof may be of cast metal, if so desired.

The frame comprises horizontal side members 2 and 3 and end members 4 and 5, preferably of channel cross-section, having their ends suitably secured together at the corners of the frame and to upright supporting legs 6—6 and 7—7, by such means as welding, well-known in the art, thereby to provide a very rugged frame structure, as best illustrated in Figure 3. The upright supporting legs 6—6 and 7—7 are preferably of angle iron cross-section. Angle brackets 8 are shown welded to the upper ends of the legs 6—6 and 7—7 to provide sturdy connections between the legs and the rectangular frame structure formed by the side and end frame members, as will be understood by reference to Figure 1. The horizontal side and end frame members may be welded to the angle brackets 8 to provide, in effect, an integral frame structure.

Horizontally disposed longitudinal frame members 9—9 secure together the lower portions of the legs 6 and 7 at each side of the machine, and similar cross-members 11 are provided at the receiving and discharge ends of the machine, as indicated in dotted lines in Figure 1. Metallic plates 12 and 13, such as boiler plate, are suitably secured in fixed relation to the tops of the side and end frame members by such means as welding, and have their inwardly facing edges 14 and 15 spaced apart, as best shown in Figure 3, for purposes subsequently to be described. These plates cooperate to provide the work-supporting table or bed of the machine.

*Feed rolls (receiving end)*

The receiving end of the machine is shown provided with a pair of movably mounted feed rolls 16 and 17 spaced apart in the direction of lumber travel, as illustrated in Figure 5. The feed rolls 16 and 17 cooperate with stationary axised feed rolls 18 and 19, respectively, to feed the lumber into the machine into engagement with the circular saws, subsequently to be described.

The feed rolls are supported upon a frame, generally designated by the numeral 21, which constitutes an extension of the main frame. It comprises side frame members 22 and 23 (Fig. 5) of channel cross-section, shown supported upon upright angle iron legs 24—24 and 25—25, tied together at their lower portions by suitable angle-iron cross members 26, 27 and 28, and longitudinally extending side members 29—29, all welded together to provide a very substantial and rugged supporting structure.

Interposed between the side frame members 22 and 23 are a plurality of cross-channels 31, 32, 33 and 34, arranged in spaced parallel relation, as best illustrated in Figure 5, and having their ends suitably welded or otherwise secured to the side frame members 22 and 23. Cross-channels 31 and 32 are arranged in face-to-face relation and spaced apart to provide a gap therebetween for the lower feed roll 18. The periphery of feed roll 18 projects slightly above the upper surface of the cross-channels 31 and 32 so that the feed roll 18 may feedingly engage the bottom surfaces of the boards B, fed into the machine, as indicated in Figure 5. Guide flanges 35 and 36 are provided on the upper portions of the channels 31, 32 and 34 to guide the ends of the boards over the tops thereof, as will readily be understood by reference to Figure 5.

Feed roll 18 is secured to a shaft 37 rotatably supported in bearings 38—38 secured to side frame members 39—39, suitably secured to the cross-channels 31 and 32. The upper feed roll 16 is secured to a shaft 41 mounted in suitable bearings provided at the ends of a hood 42 mounted for pivotal movement about the axis of a shaft 43, supported in bearings 44—44 secured to the side frame members 22 and 23. The hood 42 substantially encloses the feed roll 16, as shown in Figure 5. The movable feed roll 16 is driven from shaft 43 by a pair of back gears 45 and 46 (Fig. 3) secured, respectively, to the shafts 41 and 43. Shaft 43 is driven from the shaft 37 of the stationary feed roll 18 by a suitable chain drive, generally designated by the numeral 47. By this arrangement it will be noted the feed rolls 16 and 18 are rotated in opposite directions so as to grip and feed each board into the machine. The complemental feed rolls 17 and 19 are driven in substantially the same manner as feed rolls 16 and 18, and the corresponding parts thereof are therefore identified by like numerals.

Means is provided for constantly yieldingly urging the movable feed rolls 16 and 17 downwardly into feeding relation to their complemental feed rolls 18 and 19. Such means is shown comprising a cross-head 48 having tubular members 49 secured to the ends thereof and extending upwardly therefrom to provide elongated guides for a pair of tension rods 51. The upper ends of rods 51 are pivotally connected to the corresponding ends of the hoods 42, as indicated at 52 in Figures 3, 5 and 7. The lower threaded end portions 53 of the rods 51 extend a suitable distance below the bottom of the cross-head 48, and have compression springs 54 coiled thereabout, the upper ends of which are engaged with lock nuts 55 secured to the lower ends of the tubular guides 49, as shown in Figure 5. The lower ends of springs 54 are seated against suitable abutments 56 secured to the lower terminals 53 of the guide rods by such means as nuts 57. The springs 54 constantly urge the rods 51 downwardly to retain the movable feed rolls in feeding engagement with a board passing through the machine.

In some instances, it may be desirable to vary the feeding pressure exerted against the boards by the movable feed rolls 16 and 17. To thus vary the feeding pressure of the feed rolls on the boards, the cross-head 48 is shown having its intermediate portion threadedly engaged with a threaded rod or shaft 58 mounted for rotation in a bearing 59 and having a suitable hand wheel 61 secured to its lower end. Rotation of the hand wheel 61 will cause the cross-head 48 to move upwardly or downwardly, as will readily be understood, whereby the feeding pressure on the boards may readily and conveniently be varied at any time by the simple rotation of the hand wheel 61.

*Edge trimmer*

The boards to be ripped may vary considerably in width, and some may be warped more or less in an edgewise direction, whereby it may become necessary to straighten one edge thereof so that the various strips cut from each board will be uniform in width the full length thereof. To thus trim and straighten one edge of each board, a trimming wheel, generally designated by the numeral 62, is fixed to the shaft 63 of a vertically disposed electric motor 64, shown secured to a mounting plate 65 having its upper end suitably secured to the cross-channel 33, as best illustrated in Figure 5. The trimming wheel rotates about a vertical axis and has its cutting face positioned to engage one edge of each board B, as the boards are successively fed into the machine, as indicated in Figure 3.

To guide each board into engagement with the trimming wheel 62, an elongated guide bar 66 of angle cross-section is shown extending longitudinally from the frame extension 21, as best illustrated in Figure 13, and is secured to longitudinally spaced supporting members 67 by such means as bolts 68. The supporting members 67 are mounted for limited lateral sliding movement in T-shaped guides 69 and 71, as shown. The guide 69 is secured to a bracket 72 mounted upon and secured to the cross-channel 31 of the extension frame 21.

Longitudinally spaced idler rollers 73 and 74 are mounted upon upright frame members or pedestals, generally designated by the numerals 75 and 76, each comprising upright legs 77 and 78 and upper and lower cross-members 79 and 81, respectively, as shown in Figure 14. Base members 82 may be secured to the bottom ends of the pedestals 75 and 76 adapted to engage the floor and to facilitate anchoring the pedestals thereto.

Brackets 83 and 84 are shown secured to the upper ends of pedestals 75 and 76 and have suitable bearing blocks 85 secured thereto for receiving the shaft terminals of the idler rollers 73 and 74. The T-shaped guide 71 at the outer end of the guide bar 66 is mounted in a suitable bracket secured to the outer pedestal 75, not shown in the drawings. In practice, the guide bar 66 is usually located adjacent to a suitable lumber supply table or rack 70, indicated in dotted lines in Figure 13.

Each board to be ripped into a plurality of longitudinal strips is positioned upon the idler rollers 73 and 74 against the guide member 66, by an operator stationed in front of the guide bar 66. If the board is laterally warped or requires that one edge be trimmed, the operator laterally adjusts the guide bar 66 by manipulation of a suitable lever 86, conveniently located beneath the path of travel of the board, as indicated in Figure 14. The lever 86 is shown fixedly secured to a rock shaft 87 mounted in bearings 88 provided in the spacing blocks 84, as shown in Figure 14.

A pair of eccentrics 89 are secured to the shaft 87 and have split bearing members 91 rotatably supported thereon, as best illustrated in Figure 15. Each bearing member 91 has a depending arm 92, the lower ends of which are pivotally connected to the corresponding ends of a pair of links 93. The oposite ends of links 93 are pivoted to the lower ends of the brackets 72, as shown at 94 in Figure 15. The bearing elements 91 are provided with upright arms 95 similar to the arms 92, which are similarly connected to a pair of links 96 pivoted at 97 to downwardly extending lugs 98 of the supporting members 67.

Figure 7:
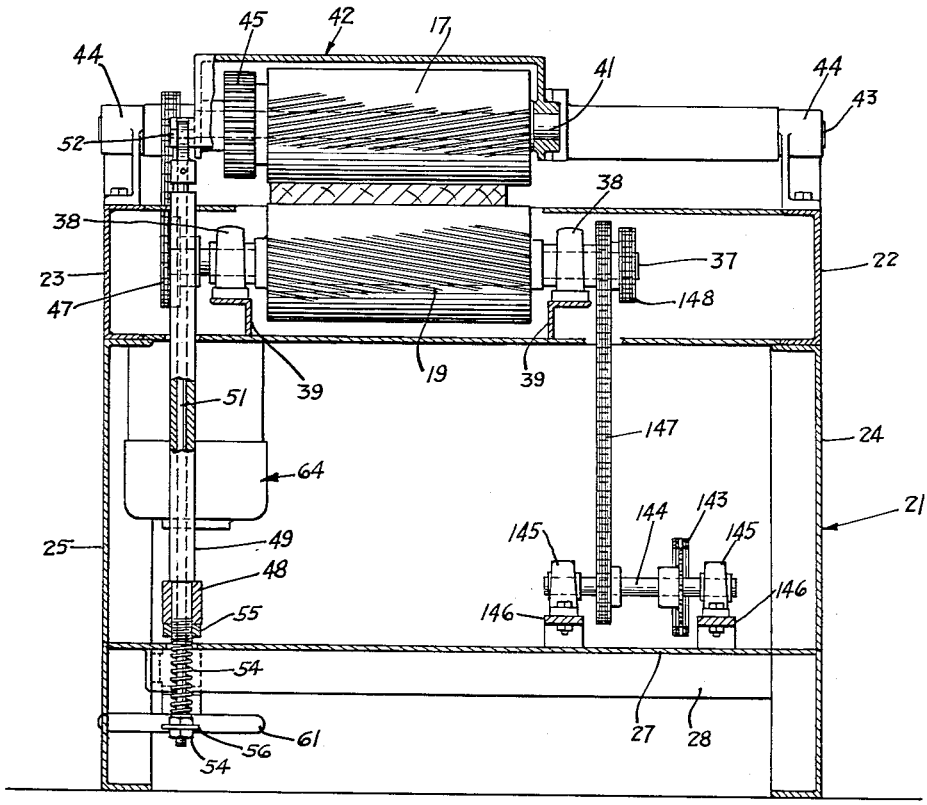
Figure 7 is a cross-sectional view on the line 7—7 of Figure 5, showing the drive for the feed rolls at the receiving end of the machine.

By connecting the eccentrics 89 to the supporting members 67 of the elongated guide bar 68, as above described, manipulation of the lever 86 will effect lateral adjustment of the guide member 66 relative to the trimming wheel 62, so that the operator may at all times accurately control the depth of the cut of the trimming wheel on the edge of the board being fed into the machine. The peripheries of the feed rolls 16—18 and 17—19 are preferably spirally corrugated, as indicated in Figures 7 and 13, thereby to constantly urge the boards into cutting engagement with the edge trimmer 62 and the guide bar 66.

*Feed rolls (discharge end)*

Figure 6:
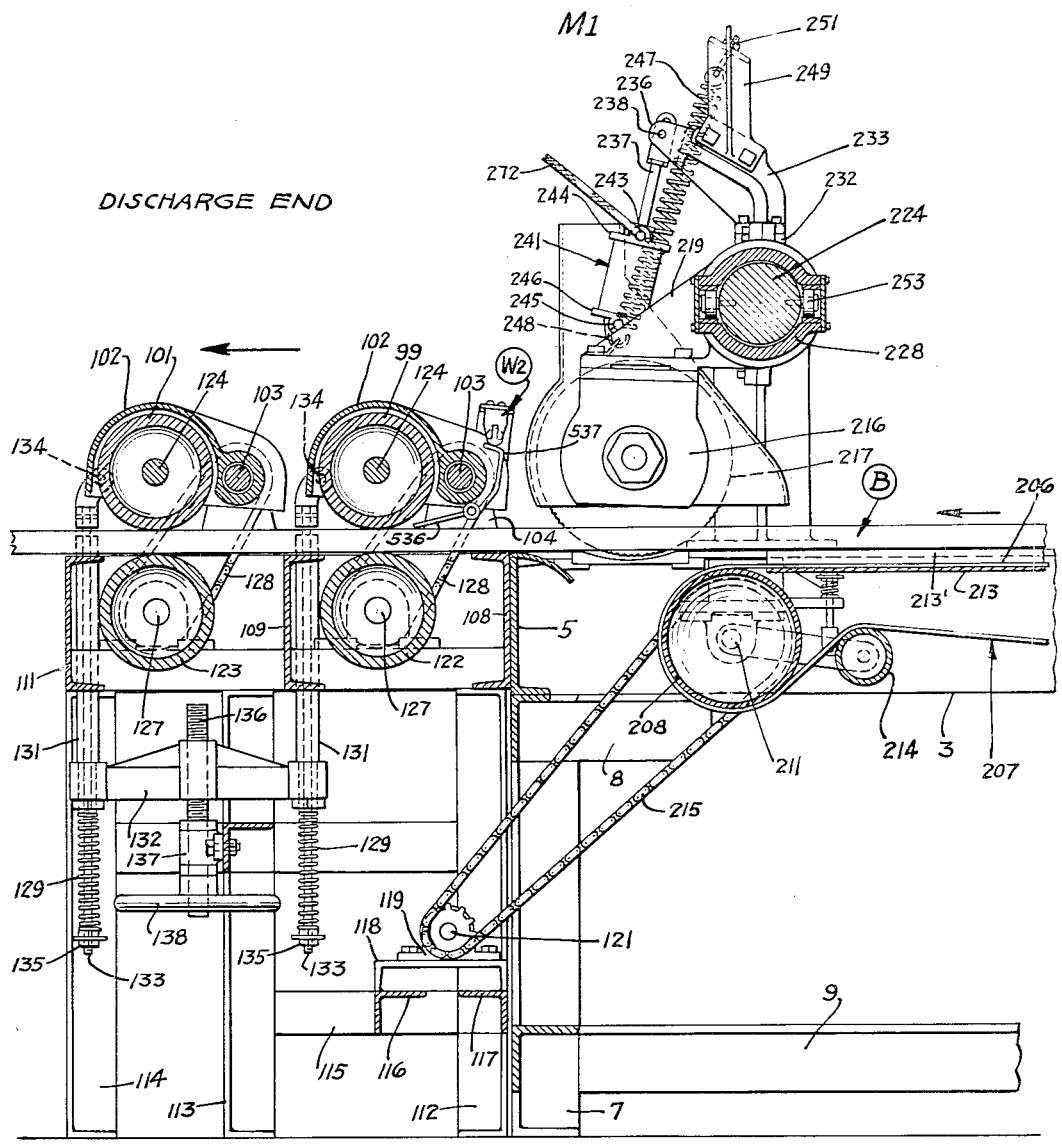
Figure 6 is a detail sectional view on the line 6—6 of Figure 3, showing the feed rolls at the discharge end of the machine.

A pair of spring pressed feed rolls 99 and 101, similar to the feed rolls 16 and 17 at the receiving end of the machine, are provided at the discharge end of the machine, as best shown in Figure 6. The feed rolls 99 and 101 are mounted in suitable housings 102 mounted for pivotal movement about the axes of a pair of spaced shafts 103, supported in bearing blocks 104 secured to a rearwardly extending frame portion 105 of the main supporting frame. Frame portion 105 comprises side members 106 and 107 and a plurality of cross-channels 108, 109 and 111, supported on a plurality of upright legs 112, 113 and 114, preferably of angle cross-section. Side frame members 115 are interposed between and secured to the lower portions of the upright legs 112 and 113, and have cross-channels 116 and 117 interposed therebetween to provide a support for a bracket 118, having bearing blocks 119 secured thereto for supporting a countershaft 121.

Stationary feed rolls 122 and 123 cooperate, respectively, with the movable feed rolls 99 and 101 to engage the strips of lumber and feed them outwardly from the machine onto a suitable receiving table, not shown in the drawings. The spring pressed rolls 99 and 101 are secured to shafts 124 mounted in suitable bearings provided at the ends of the housings 102. Back gears 125 and 126 (Figure 3) operatively connect together the shafts 103 and 124 for rotation in opposite directions. Shafts 103 are driven from the shafts 127 of the stationary feed rolls 122 and 123 by suitable chain drives 128.

The relatively movable feed rolls 99 and 101 at the discharge end of the machine are normally urged downwardly into feeding engagement with the lumber strips by suitable compression springs 129, similar to the springs 54 at the receiving end of the machine. Tubular members 131, similar to members 49, have their lower ends fixed in a cross-head 132 and extend upwardly through guide openings in the horizontal legs of the channel members 109 and 111. Tension rods 133 have their upper ends pivotally connected to the housings 102, as indicated at 134 in Figure 6, and are longitudinally slidable in the tubular guides 131 under the influence of the spring elements 129. The tension of springs 129 may be varied by manipulation of the nuts 135 received in threaded engagement with the lower ends of the tension rods 133. The cross-head 132, like cross-head 48 at the receiving end of the machine, is vertically adjustable by rotation of a threaded stem or shaft 136, rotatably supported in a bearing 137 and having a hand wheel 138 secured to its lower end. Feed rolls 99—122 and 101—123 have their peripheries spirally grooved in a manner similar to the peripheries of the feed rolls 16—18 and 17—19 at the receiving end of the machine.

*Drive for feed rolls*

The means provided for driving the feed rolls is best illustrated in Figures 1, 3 and 7, and comprises an electric motor 139, operatively connected to a speed reducer 141 by a chain drive 142, indicated in Figure 3. A suitable chain drive 143 transmits power from the speed reducer 141 to a countershaft 144 mounted in suitable bearings 145 secured to a portion 146 of the forward frame extension 21, as best indicated in Figures 1 and 7. A similar chain drive 147 transmits power from countershaft 144 to shaft 37 of the stationary feed roll 19 which, in turn, transmits power to feed roll 18 through a chain drive 148.

In like manner, power is transmitted from countershaft 121 to shaft 127 of feed roll 122 at the discharge end of the machine, through a chain drive 149. A chain 151 provides a driving connection between the shafts 127 of the stationary feed rolls 122 and 123, as clearly illustrated in Figures 1 and 3. Countershaft 121 is driven from the speed reducer 141 by a chain drive 152.

*Sweeper for machine bed*

Means is provided for cleaning or clearing the machine bed of sawdust, chips and other debris following each ripping operation, and is shown comprising an elongated member, generally designated by the numeral 153, which will hereinafter be referred to as the "sweeper." The sweeper is best illustrated in Figures 2, 3, 8 and 9, and is shown comprising a flat bar 154 having an angle bar 155 secured to the front edge portion thereof. One leg of the angle bar 155 extends upwardly to engage an edge of each board fed through the machine, whereby said member serves as a guide for the boards as they successively pass through the machine. The sweeper 153 is normally positioned against suitable stops 156 and 157, (Figure 3) secured to the bed of the machine by such means as bolts 158.

Means is provided for guiding the sweeper 153 across the machine bed, and is shown comprising a guide rod 159 provided at one end with a head 161 which is secured to the sweeper 153 intermediately of its ends. Rod 159 extends laterally from the sweeper bar at substantially right angles thereto, and has one end of a brace member 162 secured to its outer end, as shown at 163 in Figures 2 and 8. The opposite end of the brace member 162 is suitably secured to the sweeper 153 by such means as bolts 164. The rod 159 is slidably supported in a tubular guide 165, fixedly secured to the machine bed by such means as bolts 166, best shown in Figures 3 and 8.

The sweeper 153, it will be noted by reference to Figure 4, engages the top surface of the machine bed and is adapted for lateral sliding movement over the surface thereof, thereby to remove sawdust, chips and other debris which may be left on the machine bed or table following each sawing or ripping operation. Such debris is shoved laterally from the path of travel of the boards into the elongated opening 167 provided in the machine bed between the spaced edges 14 and 15 of the bed plates 12 and 13, as illustrated in Figure 3.

To laterally operate the elongated sweeper 153, one end of a piston rod 168 is secured thereto which extends laterally therefrom in spaced parallel relation to the guide rod 159. A pneumatic cylinder 169 has a head 170 at one end which is mounted upon and secured to the machine bed in fixed relation thereto by such means as bolts 171. A bracket 172 has one end secured to the side member 3 of the main supporting frame and extends outwardly therefrom to provide a support for the outer projecting end portion of the cylinder 169.

The cylinder has a similar head 173 secured to its opposite end which is suitably bolted to the bracket 172, as shown in Figures 4 and 8. The piston rod 168 extends into the cylinder 169 and has a piston head 174 at its outer end, indicated in dotted lines in Figure 8. Conduits 175 and 176 are connected, respectively, to the heads 170 and 173 of the cylinder 169 for conducting a suitable pressure fluid to and from the opposed ends of the cylinder from a suitable electrically operated control valve, generally designated by the numeral 177, shown in Figure 8A, as will subsequently be described.

The pneumatic control valve 177 is schematically illustrated in Figure 8A and comprises a body 178 having a bore 179 therein in which is mounted a slide valve 180 for controlling fluid flow to and from the opposed ends of the cylinder 169, thereby to impart reciprocal movement to the piston 174 within the cylinder 169 so as to alternately move the sweeper 153 back and forth over the machine bed. The valve body 178 is shown provided with threaded sockets 181 and 182 to which the opposed ends of the conduits 175 and 176 are connected, thereby to establish fluid circulation between the valve 177 and the piston heads 170 and 173. The valve 177 also has an air intake 183 connected to a source of pressure fluid, such as compressed air, not shown, in the drawings. It also has an exhaust port 184.

In Figure 8A, the slide valve 180 is shown electrically operated by a suitable solenoid, generally designated by the reference character F. This solenoid comprises a housing 190 in which a movable element or core 186 is mounted. The core 186 has one end secured to the slide valve 180 for direct movement therewith. The usual solenoid winding or coil 187 is enclosed within the housing 190 in magnetic relation to the core 186. One end of the valve body 178 is secured to the housing 190 of the solenoid, as indicated in Figure 8A, and is shown provided with the usual terminals 188 and 189 for connecting it in an electric circuit, as will subsequently be described. The slide valve 180 is normally retained in the position shown in Figure 8A by a spring 300.

A switch-actuating rod 191 is secured to the sweeper 153 for direct movement therewith and has one end anchored in a bracket 192 secured to the bar 154 of the sweeper 153, as shown in Figure 9. The opposite end of rod 191 is secured to a bracket 193 fixed to the outer end portion of brace 162, as best shown in Figure 8. Switch-actuating elements 194 and 195 are secured to rod 191 for actuating a switch operator 196 of a control switch, generally designated by the reference character E. In the drawings, the switch operator 196 is shown comprising a spool-like member 197, secured to a relatively short rod 198, slidably mounted in a bracket 199, secured to the rear portion of the machine bed by such means as screws 201. See Figures 8 and 9.

When the sweeper is in its normal back position, the switch operating member 197 is in the position shown in Figures 8 and 9, whereby the pivoted arm 202 of a control switch E is in circuit-closing position, whereby the movable contact 203 of switch E is in circuit-closing engagement with its complemental fixed contact 204, as shown in the wiring diagram, Figure 23. Thus, the movable contact 203 of switch E is adapted to be moved into or out of electrical engagement with the fixed contact 204 by reciprocal movement of the switch operating member 197, effected by movement of the sweeper.

Mounted in the opening 167 in the machine bed is the upper run 206 of an endless conveyor belt, generally designated by the numeral 207, as shown in Figures 3 and 6. The belt 207 is mounted on rollers 208 and 209, secured, respectively, to shafts 211 and 212, supported in suitable bearings indicated in dotted lines in Figures 1, 3, 5 and 6. A plate 213 supports the upper run 206 of the conveyor belt against sagging from the weight of material delivered thereonto by sweeper 153. The plate 213 is provided with upstanding flanges 213' which may be secured to the edges 14 and 15 defining the opposed side edges of the opening 167 in the machine bed. A suitable spring-actuated belt tightener, generally designated by the numeral 214, has a running connection with the lower run of the conveyor belt 207 and constantly retains the belt at the proper operating tension. The conveyor belt 207 is shown driven from the counter-shaft 121 by a suitable chain drive 215. Suitable means, not shown, may be provided at the discharge end of the upper belt run 206 for receiving the material discharging therefrom during the operation of the machine.

*Multiple saw heads*

The means provided for longitudinally ripping each board fed through the machine into a plurality of strips of predetermined widths, is best illustrated in Figures 1 and 2, and comprises a plurality of saw heads, generally designated by the reference characters M1, M2, M3 and M4. The saw heads are mounted for independent or simultaneous reciprocal movement over the machine bed, depending upon the number of strips into which each board fed into the machine is to be cut. As the several saw heads are identical in construction, but one need be described in detail.

Figure 11:
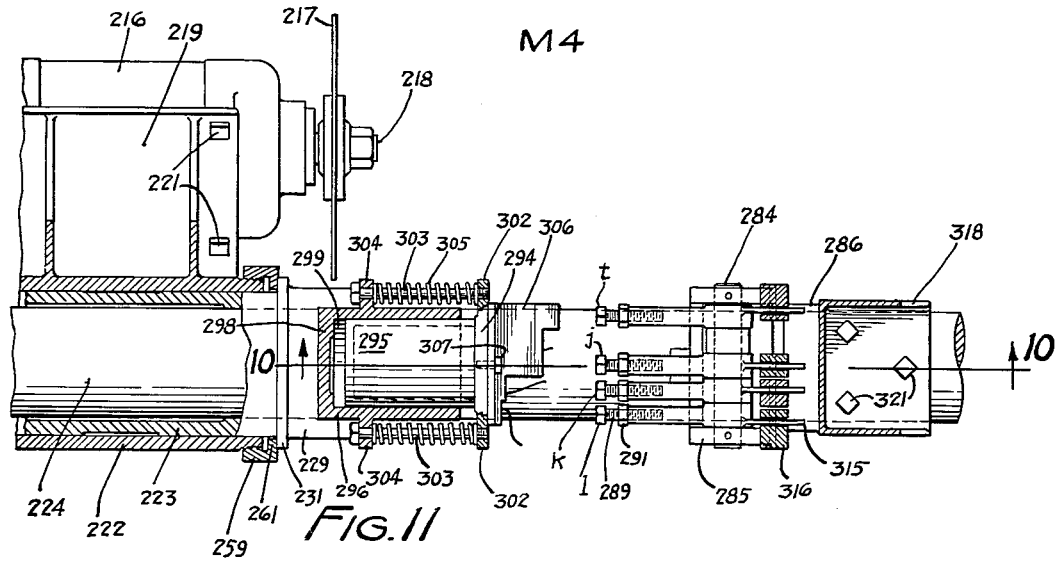
Figure 11 is a sectional plan view on the line 11—11 of Figure 10.

Each saw head comprises a motor 216 having a circular saw 217 secured to its shaft 218 for direct rotation therewith. The motor 216 is detachably secured to a suitable bracket 219 by bolts 221 (Figure 11). The bracket has a split hub 222 mounted for limited rotary movement upon a tubular member or sleeve 223, non-rotatably supported upon a cylindrical supporting member 224 having its end portions supported in split hubs 225 and 225' of a pair of pedestals 226 and 226', respectively, mounted upon and secured to the machine bed by such means as bolts 227. See Figure 4.

The tubular member 223 is provided with opposed end portions 228 and 229 which may be made integral therewith, as indicated in Figure 4. Annular flanges 231 are provided between the ends of the central bearing portion or sleeve 223 and the adjacent ends of the end portions 228—229, for preventing relative axial movement of the split hub 222 on the cylindrical bearing portion 223.

The cylindrical bearing portion 223 is shown provided with a raised portion or boss 232 having its upper face machined to receive a bracket 233, fixedly secured thereto by bolts 234 (Figure 4). A suitable opening 235 is provided in the wall of the split hub 222 to permit said hub and the bracket 219 to relatively rock upon the sleeve 223, when the saw 217 is lowered into cutting relation to the machine bed, or elevated to its inoperative position, as will be understood by reference to Figure 5.

The upper portion of the bracket 233 is off-set to overhang the bracket 219, and has a forked end 236 to which one end of a piston rod 237 is pivotally connected by a pivot pin 238. The piston rod 237 has a piston head 239 secured to its lower end, as best illustrated in Figure 5, upon which a cylinder 241 is mounted for reciprocal movement. The lower end of cylinder 241 is pivoted to the bracket 219 by a pivot pin 242. An air intake 243 is provided in the upper cylinder head 244 of cylinder 241 to which one end of an air supply conduit may be connected, as will subsequently be described. An exhaust opening 245 is provided in the bottom head 246 of the cylinder 241 to permit free flow of air into and out of the lower portion of the cylinder when the cylinder is reciprocated upon the piston rod 237.

One end of a suitable spring 247 is secured to the bracket 219, as indicated at 248 in Figure 5, to counter-balance a portion of the weight of the saw motor 216. The upper end of spring 247 is adjustably attached to the upper end of a racket 249 by an eye bolt, as indicated at 251. The bracket 249 may be mounted directly upon and secured to the bracket 233.

Means is provided for preventing the tubular member or sleeve 223 from relatively rotating upon the cylindrical supporting member 224. To thus prevent relative rotation of the member 223 upon the supporting member 224, the end portions 228 and 229 thereof are shown provided with parallel guideways 252, formed by axially slotting said end portions from the ends thereof, as best illustrated in Figures 4, and 4A. Anti-friction guide rollers 253 are secured to the supporting member 224 by suitable shouldered studs 254, as best indicated in Figure 4A. The anti-friction rollers 253 at each end of the cylindrical bearing sleeve 223 are disposed in diametrically opposed relation, and are so fitted in the guide ways 252 as to permit free longitudinal movement or the cylindrical sleeve 223 upon the supporting member 224, but preventing relative rotary movement of said member on the support 224. Suitable wear plates 255 are shown secured to the opposed faces of each guideway 252 to resist wear of the anti-friction rollers 253 in said guideways.

To prevent dust and other foreign matter from accumulating on the guideways 252, suitable dust caps or closures 256 are secured to the extensions 228 and 229 for enclosing the guideways 252 and the anti-friction rollers 253, as will be clearly understood by reference to Figures 4 and 4A. The dust caps or closures 256 are detachably secured in place by suitable bolts or cap screws 257. Each closure is provided at its outer end with a groove adapted to receive a packing element 258 having its projecting edge engaging the periphery of the supporting member 224, thereby to prevent dust and other foreign matter from entering said guides from the outer ends thereof.

To reduce and take up endplay of the hub 222 of the bracket 219 on its supporting sleeve 223, an adjusting collar 259 is received in threaded engagement with one end of the split hub 222 and has an inturned flange 261 adapted to engage the adjacent annular flange 231 of the tubular supporting sleeve 223, as best illustrated in Figure 11. The adjusting collar 259 is split whereby it may readily be secured in adjusted position by manipulation of the screws 262, shown in Figure 4.

The several saw heads are mounted for reciprocal movement upon their respective supporting members 224, as when moving into and out of cutting positions over the machine bed during operation of the machine. In the structure, as herein disclosed, pneumatic means is provided for imparting horizontal and vertical movements to each saw head, as best illustrated in Figure 4. As here shown, a cylinder 263 is mounted on the split hub 225 of the pedestal 226, and has a piston 264 mounted for reciprocal movement therein. The piston has a rod 265 projecting from the cylinder head 266 which has its outer end adjustably secured to a projection or bracket 267, shown provided on the adjacent end portion 228 of the tubular bearing sleeve 223. The piston rod 265 has its outer end portion threaded to receive spaced nuts 268 for securing the piston rod to the bracket 267, as will readily be understood by reference to Figure 4.

A nipple 269 has one end in communication with the cylinder head 266 and its opposite end is shown connected to a fitting 271. A flexible conduit 272 has one end connected to the fitting 271 and its opposite end to the intake 243 of cylinder 241, thereby to establish communication between cylinders 241 and 263, whereby when air is admitted into cylinder 263 through fitting 271 at the termination of each cycle of operation, air is simultaneously admitted into the upper end of cylinder 241 to automatically raise saw 217 out of cutting relation with the machine bed. The cylinder head 273 at the opposite end of cylinder 263 has one end of a conduit 274 connected thereto for conducting air to and from the adjacent end of cylinder 263. The opposite end of conduit 274 is connected to a valve, generally designated by the numeral 275, which is similar in construction and operation to the valve 177, shown in Figure 8A.

Another conduit 276 has one end connected to the valve 275 and its opposite end to fitting 271 for supplying air to and from the cylinder head 266. The valve body 275 has an air intake 277 connected to an air supply pipe 278. The valve is also shown provided with an exhaust 278'. A slide valve, not shown in Figure 4, is mounted in the valve body 275 and is adapted to be operated in one direction by a solenoid 279 having a winding 281 therein similar to the winding 187 of the solenoid 185, shown in Figure 8A. The winding 281 of solenoid 279 is shown provided with terminals 282 and 283 for connecting it to an electric circuit, as will subsequently be described. The construction and operation of valve 275 and its solenoid 279 are substantially identical to the construction and operation of the sweeper control valve 177, illustrated in Figure 8A, and it is therefore believed unnecessary herein to describe valve 275 in further detail. The body of the valve 275 is shown mounted on the pedestal 226 by a suitable bracket 280.

To make certain that the circular saws 217 will cut clear through each board, the surface of the machine bed directly beneath each circular saw is transversely recessed, as indicated at 200 in Figures 2 and 17, whereby the terminals of the saw teeth pass beneath the top surface of the machine bed, when the saws are in cutting engagement with a board, as best illustrated in Figures 16 and 17.

To thus recess the top surface of the machine bed, a plurality of enlarged openings are provided in the machine bed, one directly beneath each saw. A plate member 200' is fitted into each such opening and is secured in place therein by securing bars 200" which have their opposed side edges secured, respectively, to the machine bed and the plate member 200' by suitable bolts, shown in Figures 16 and 17. The top surface of each plate member 200' is longitudinally recessed, as shown in Figure 16 to prevent direct contact of the saw teeth therewith, when the saws are lowered into cutting relation to the machine bed.

Stop mechanism

Means is provided for limiting the forward movement of the saw heads as they advance from their normal inoperative positions to their sawing positions over the machine bed, in accordance with the number of strips to be cut from each board. To thus limit the forward movements of the saw heads, a plurality of movable stop elements, generally designated by the reference characters $a$, $b$, $c$, $d$, $e$, $f$, $g$, $h$, $i$, $j$, $k$ and $l$, are provided, as best illustrated in the wiring diagram, Figure 24. As here shown, the movable stop elements are divided into four similar groups, one such group being utilized for each saw head.

To simplify the description, but three movable stop elements are provided in each group. The number of groups of stop elements employed is dependent upon the number of saw heads utilized, and also upon the number of lumber-ripping combinations desired in a given machine. The stop mechanisms for the various saw heads are substantially identical in construction and it will therefore be necessary to describe but one such mechanism in detail.

Figure 10:
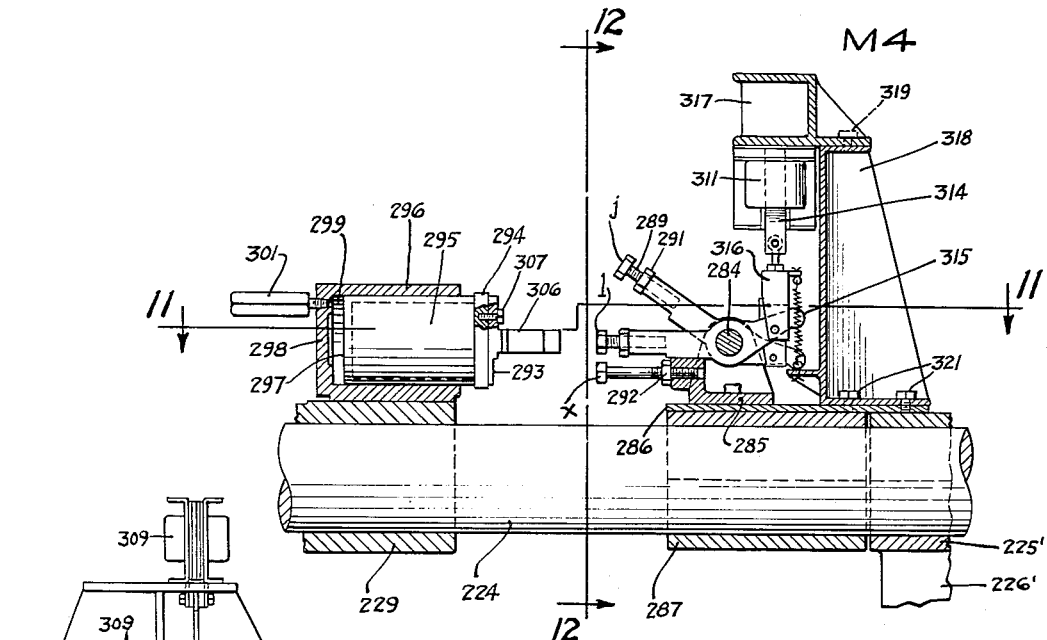
Figure 10 is an enlarged detailed sectional view on the line 10—10 of Figure 11, showing the electrically operated stop mechanism for one of the saw heads.
Figure 12:
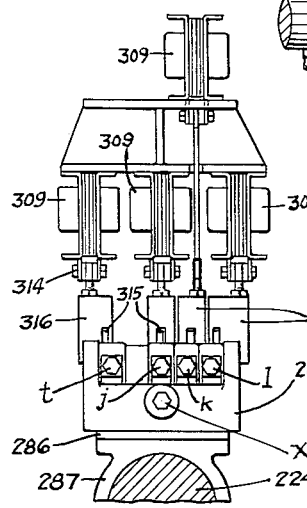
Figure 12 is a cross-sectional view on the line 12—12 of Figure 10, showing the preferred mounting of the solenoids for the stop elements.

In Figures 10, 11 and 12 there is shown a portion of saw head M4 and its stop mechanism, including movable stop elements $j$, $k$ and $l$, which are shown mounted on a pivot pin 284 supported in a bracket 285 suitably secured to a plate element 286, shown seated upon and secured to a split sleeve 287. Sleeve 287 is mounted upon and fixedly secured to the adjacent end of the cylindrical supporting member 224 by clamping bolts 288, shown in Figure 4. The plate element 286 is shown overhanging one end of the split hub 225' of pedestal 226'.

Each stop element $j$, $k$ and $l$ has an abutment screw 289 secured to its outer end. These screws are longitudinally adjustable in their respective stop elements to facilitate accurately positioning the saw head, when in its forward lumber-ripping position. Lock nuts 291 secure the abutment screw 289 in their adjusted positions upon their respective stop elements. Each stop mechanism also includes a permanent or fixed stop $x$, which may be in the form of a conventional cap screw received in threaded engagement with bracket 285 and is longitudinally adjustable therein. The fixed stop $x$ is shown located directly below stop element $j$, and is secured in adjusted position by a lock nut 292, shown in Figure 10.

In Figure 11, there is illustrated an additional movable stop element $t$. As hereinbefore stated, it is to be understood, however, that the number of stop elements utilized for each saw head may be varied, and is dependent upon the number of board-ripping positions required of each saw head. The permanent stop element $x$, as hereinbefore stated, is secured in fixed position in the bracket 285 and is arranged to engage an abutment face 293 provided on the head 294 of a piston 295. Piston 295 is mounted in a cylinder 296 which has its inner end 297 normally spaced from the adjacent end wall 298 of cylinder 296 to provide an air chamber 299, which serves as a cushion for the piston 295, when the latter impinges against one of the stop elements $j$, $k$ or $l$, in the forward movement of the saw head. An air valve 301 has one end received in threaded engagement with the end wall 298 of cylinder 296 and serves to restrict the flow of air from the air chamber 299 to provide the desired cushioning effect, each time the piston engages a stop element, during the operation of the machine. From the foregoing it will thus be noted that the piston 295 and cylinder 296 cooperate to provide a dashpot for absorbing the impact of the cylinder 295 with a selected stop element.

The head 294 of piston 295 is shown provided with oppositely disposed ears 302 threaded to receive the terminals of a pair of bolts 303, having their opposite ends slidably received in ears 304 provided on the periphery of cylinder 296, as clearly illustrated in Figure 11. Suitable springs 305 are interposed between the lugs or ears 302 of the cylinder head 294 and the ears 304 of cylinder 296 and cooperate with the air cushion provided by the air chamber 299, to absorb shocks imposed on the parts each time the saw head comes to rest at the end of each forward movement.

A plurality of abutment surfaces $j'$, $k'$ and $l'$ are provided on a stepped member 306, secured to the piston head 294 by bolts 307, as indicated in Figures 10 and 11. The bolts 303 also serve to prevent the piston 295 from relatively rotating in the cylinder head 296, thereby to maintain the abutment surfaces $j'$, $k'$ and $l'$ in operative alignment with their respective abutment elements $j$, $k$ and $l$, as will be understood by reference to Figures 10 and 11. Cylinder 296 is shown fixedly secured to the end portion 229 of the cylinder supporting sleeve 223 by such means as bolts 308, as shown in Figure 4.

To effect instant and automatic operation of the stop elements $j$, $k$ and $l$, electrical means is provided for selectively moving said stop elements into operative positions, and is here shown comprising a plurality of relays or solenoids, generally designated by the numeral 309. Each relay is shown having a movable core 314 which are pivotally connected to the off-set arms 315 of their respective stop elements $j$, $k$, $l$ and $t$ by suitable connecting links 316, shown in Figures 10 and 12. Relays 309 are of conventional construction, and therefore need not be further described in detail. They are shown supported from a vertical bracket 318 by such means as bolts 319. Bracket 318 may be secured to the plate element 286 by suitable bolts 321, as shown in Figure 10. To economize space horizontally, relay 309 of stop element $k$ may be mounted on top of bracket 317 whereby it may require a relatively longer connecting link 316 to connect its armature to its stop element $k$. See Figure 12.

The saw heads M1, M2, M3 and M4 are normally mounted in laterally off-set relation relative to one another and the machine bed, as best illustrated in Figure 2, thereby to eliminate unnecessary horizontal travel of the saw heads upon their respective supporting members 224. Because of the off-set disposition of the saw heads, the movable stop mechanisms for the various saw heads are similarly laterally off-set in order that the normal spacing between the stepped abutment members 306 of the saw heads and their respective movable stops may be maintained somewhat uniform, when the saw heads are in their normal inoperative positions. By so off-setting the various groups of stop mechanisms, the split sleeve 287 shown in Figure 10 may be dispensed with in the mounting of the movable stop mechanisms for saw heads M1, M2, and M3, the stop elements for these three saw heads being shown mounted directly upon and secured to the split caps 255' of their respective pedestals 226', as will be understood.

Control mechanism

The control mechanism of the various saw heads includes a control unit or box and a plurality of electrical devices and switches interconnected by a plurality of electric circuits which are so related to one another and to the various other mechanisms of the machine, that when the operator manipulates the control unit, the various electric devices and associated mechanisms will function in proper sequence to automatically shift the saw heads into their operative sawing positions over the machine bed, and at the termination of each ripping or cutting operation, the sweeper 153 is actuated to clear the machine bed of sawdust and other debris, and to condition the machine for the next cycle of operation.

The control unit or box, generally designated by the numeral 322, is illustrated in Figures 18, 19, 20 and 21, and comprises a bottom wall 323 shown secured to the upper end of a suitable standard or pedestal 324 by such means as bolts 325. The pedestal 324 is provided at its lower end with a supporting base or flange 326 adapted to be supported upon the floor adjacent to the operator.

A tubular post or member 327 having a base flange 328 at its lower end, is secured to the bottom wall 323 of the control box by bolts 329, and has an annular shoulder 331 against which the lower end of a suitable bearing sleeve or bushing 332 is engaged. Bearing sleeve 332 cooperates with a bearing sleeve 333 to rotatably support a hub 334 upon the post 327. The hub 334 has an off-set portion 335 extending laterally therefrom and provided at its outer end with an upright portion 336 which terminates at its upper end in a horizontal inwardly extending member 337. A collar 338 is secured to the inner end of member 337 in axial alignment with the bore 339 in the hollow post 327. The portions 335, 336 and 337 cooperate to provide a U-shaped arm which is rotatably supported upon the post 327 by the hub 334.

A stud 341 has its lower end suitably fixed in the member 337 and collar 338 and has a nut 342 engaged with its upper end, thereby to fixedly secure an operating lever 343 to the member 337 for direct rotation therewith. The operating handle 343 has a pointer 344 which cooperates with suitable indicia, indicated at 345, provided upon a semi-circular scale or member 346 secured to the top wall 347 of a removable housing 348.

The indicia 345 shown on scale 346 represents different lumber-ripping combinations, as hereinbefore referred to. In Figure 20, but four lumber-ripping combinations are shown, indicated by the numerals 1, 2, 3 and 4, which corresponds to the number of lumber-ripping combinations shown on the wiring diagram. Provision is made, however, for increasing the number of ripping combinations, as will be undesrtood.

Housing 348 is shown comprising front and rear walls 349 and 351, respectively, and side walls 352 and 353. The lower marginal edges of the side walls may be extended downwardly over the opposed edges of the bottom wall 323 of the control box and may be provided with reentrant slots in their lower marginal edges for receiving screws or bolts 354, thereby to detachably secure the housing to the bottom wall 323 of the control box, as shown at the lower righthand corner of Figure 19. The upper wall 346 of the control box is apertured to receive the collar 338 whereby when the operating handle 343 is detached from the stud 341, and the screws 354 are loosened, the housing 347 may readily be removed from the top of the pedestal to gain free access to the various electrical devices contained therein, and to facilitate making adjustments in the electrical connections to increase or decrease the number of sawing or lumber-ripping combinations required to be made on a given machine.

Secured to the upper end of the tubular post 327 in insulated relation thereto is a contact ring 355, which it will be noted be reference to Figure 19, is secured to a collar 356 of insulating material which, in turn, is fixedly secured to the upper end of the post 327 and thus insulates the contact ring 355 therefrom. A spring pressed brush 357 is removably supported in a brush holder 358 provided on a fixed bracket 359 secured to the member 337 of the control lever 343. A cylindrical member or commutator, generally designated by the numeral 361, comprises a plurality of commutator bars which constitute at least a portion of the periphery of member 361, as illustrated in Figure 18. The commutator bars are insulated from one another by mica-spacers 363, as is well-known in the art, and have their inner ends insulated from one another and from the tubular post 327 by an insulating element 364, fitted upon and secured to the post 327 by suitable means, not shown in the drawings.

A second spring pressed brush 365 is slidably mounted in a brush holder 366 secured to the member 335 of hub 334 and is adapted to successively engage the bars of the commutator 361, when the operating lever 343 is relatively rotated. The brush holders 358 and 366 are of more or less conventional construction and therefore need not be further described in detail. The brush holders 358 and 366 are electrically connected together by a flexible wire 367, as shown in Figure 18. A wire 368 has one end electrically secured to the contact ring 355 and extends downwardly through the bore 339 of post 327, and out through a lateral opening 369 adjacent the lower end thereof and may be connected to one end of a contact clip 371, secured to an upright terminal block 372 of insulating material, mounted on a bracket 373 fixed to the bottom wall 323 of the control box, as indicated in Figures 18 and 22.

To simplify the explanation of the operation of the machine, the wiring diagram is shown arranged to provide but four different lumber-ripping combinations, and only four commutator bars are therefore required in the control circuits, and only four positions are shown for the control lever 343 in Figure 20.

Thus, in Figures 18 and 23 the four effective commutator bars are designated by the numerals 374, 375, 376 and 377, and wires 378, 379, 381 and 382 are connected, respectively, to the lower ends of said bars, as indicated in Figure 19. Wires 378, 379, 381 and 382 are shown passing through an opening 383 in the wall of the upright post 327, and extend downwardly through the bore therein and outwardly through the opening 369 and have their opposite ends electrically connected to a plurality of contact clips 384, 385, 386 and 387, secured to the upright terminal block 372, shown in Figures 18 and 22.

A circuit-breaker switch, generally designated by the reference character U, is mounted within the housing 388, and comprises a fixed contact 389 and a movable contact 391, as shown in Figure 23. Switch housing 388 is shown secured to a bracket 392 fixedly mounted on the bottom wall 323 of the control box, as best illustrated in Figure 19. Movable contact 391 of circuit-breaker U has an operating arm 393 disposed exteriorly of the housing 388, which carries a roller 394 adapted to roll on the notched periphery of a cam disk 395, shown secured to the lower end of hub 334 of the operating member 336 by bolts 330. The circumferential spacing of the notches 396 in the periphery of the cam disk 395 corresponds to the circumferential spacing of the commutator bars 374, 375, 376 and 377 of commutator 361, and cooperate with the spring-actuated arm 393 to retain the operating lever 343 in its selected operative position with its pointer 344 registering with one of the numerals 1, 2, 3 or 4 on the scale 346, as indicated in Figure 20.

The circuit-breaker U serves to intermittently interrupt the flow of current through certain control circuits when the control lever 343 is swung from one lumber-ripping combination to another for reasons subsequently to be described. In other words, each time the roller 394 passes over one of the high points 397 between adjacent notches 396, the arm 393 of circuit-breaker U is operated to momentarily interrupt the flow of current through the circuit-breaker, as will readily be understood by reference to the wiring diagram, Figure 23.

As hereinbefore stated, the control mechanism embodies a plurality of circuit-closers, relays and switches of various types and forms which, specifically, are well-known in the art, and it is therefore believed unnecessary herein to illustrate them in detail. These devices, however, are schematically illustrated in Figures 23, 24, 25 and 26.

In the wiring diagram, conductors L1 and L2 represent the main supply circuit, which is connected to a suitable source of electric energy, not shown. A magnetically operated circuit-holding switch, generally designated by the reference character H, is shown comprising dual pairs of normally open contacts 402—403 and 404—405. A wire 406 connects contact 402 to the main line conductor L1, and a wire 407 connects its complemental contact 403 to one end of a solenoid coil 408. The opposite end of coil 408 is connected by a wire 409 to main line conductor L2. Contact 404 has a wire 411 connecting it to a fixed contact 412 of a relay, generally designated by the reference character J, and a wire 414 connects its complemental contact 405 to the main line conductor L2.

Complemental contacts 402—403 and 404—405 of switch H are normally open, as shown in Figure 23, to prevent the flow of current therethrough. A push-button starter switch D is connected across wires 406 and 407 and is adapted to momentarily close a circuit through the solenoid 408, as will be understood by reference to Figure 23, whereby solenoid 408 is energized and thereby moves contacts 403 and 405 into electric engagement with their complemental contacts 402 and 404. Such closing of contacts 402—403 and 404—405 completes a circuit through solenoid coil 408 through wire 414, contacts 405 and 404, wires 415 and 416, contacts 417 and 418 of switch E, which is normally closed, thence through wire 419, contact 421, bridge member 422 and contact 423 of a relay K, thence through wire 425 to one side of solenoid coil 413 of relay J. The other side of solenoid coil 413 of relay J is connected by a wire 426 to the main line conductor L1, through a plurality of switches 427, connected in series with wire 426, and each mounted adjacent to one of the pneumatic cylinders 263 of the saw motors 216, as shown in Figures 4 and 24. Abutment elements 428 are carried on the piston rods 265 for engaging the pivoted arms 430 of the switches 427 to hold the movable contacts 429 of switches 427 in circuit-closing engagement with their respective fixed contacts 431, when the saw heads are in their normal retracted or inoperative positions, shown in Figures 2 and 24.

From the foregoing it will thus be noted that when switch D is momentarily closed to initially condition the machine for operation, relay J is energized which causes its bridge member 432 to move into circuit-closing engagement with contacts 433 and 434. Such closing of contacts 433 and 434 effects energization of sweeper solenoid F through wire 414, contacts 405 and 404, wire 415 to one end of the solenoid winding 187 of solenoid F, thence through wire 435, contact 434, bridge member 432 to contact 433, and thence through wire 436 to main line conductor L1. See Figure 23.

Energization of sweeper solenoid F causes slide valve 180 to be moved upwardly from the position shown in Figure 8A, whereby air is directed through conduit 176 from the air intake 183 of control valve 177 to the head 173 of cylinder 169, back of piston 174. Simultaneously, conduit 175 is opened to the exhaust 184 of the valve body, thus causing the piston rod 168 to be projected from cylinder 169 to move the sweeper across the machine bed to clear it of sawdust and other foreign matter which may have been deposited thereon as a result of the preceding cycle.

It is understood that at the termination of each cycle of operation the circuit to the sweeper solenoid F is automatically opened as a result of switch E being momentarily opened by the abutment 195 on the control rod 191 of the sweeper engaging rod 198 of switch actuator 196, when the sweeper reaches the limit of its outward movement. When switch E is thus momentarily opened, the supply of current to coil 429 of relay J is interrupted, whereupon the bridge member 432 thereof opens the circuit through contacts 433 and 434, causing de-energization of sweeper solenoid F. When solenoid F is thus de-energized, the slide valve 180 of valve 177 is returned to the position shown in Figure 8A, by spring 300, whereby air under pressure is ported into conduit 175 and thence into head 170 of cylinder 169, with the result that piston 174 and its connecting rod 168 are returned to their normal positions, indicated in dotted lines in Figure 8. Such action also returns the sweeper to its retracted or back position against the stops 156 and 157, shown in Figure 3.

Means is provided for momentarily completing a circuit to the solenoid 424 of relay K, as the sweeper 153 approaches the limit of its return movement. Such means is shown comprising a switch M having a fixed contact 437 and a movable contact 438 to which one end of wire 368 is connected. Contact 437 is electrically connected to the main line conductor L1 by a wire 439. Contacts 437 and 438 are normally open, as indicated in the wiring diagram Figure 23, when the sweeper is in its back position.

A switch-actuating element 441 is shown pivotally mounted on one end of the sweeper 153 and has a finger 442 normally positioned to engage the beveled terminal 443 of the movable contact 438. The element 441 is adapted for free pivotal movement so that when the sweeper moves outwardly across the machine bed, the element 442 will engage the movable contact 438 and swing back to the dotted line position indicated in Figure 23, without actuating contact 438, as the sweeper moves outwardly. Upon the return movement of the sweeper, finger 442 of the pivoted element 441 is retained in the full line position shown in Figure 23, whereby its terminal will engage the beveled face 433 of the movable contact 438 and momentarily move said contact into electrical engagement with the fixed contact 437, just before the sweeper reaches the limit of its return movement.

Such momentary closing of contacts 437 and 438 will complete a circuit to the solenoid coil 424 of relay K through wire 439, contacts 437 and 438, wires 368 and 445, to one end of solenoid coil 424, thence through wire 446, contacts 389 and 391 of the normally closed circuit-breaker switch U, and through wires 447 and 448 to contact 449 of relay J, thence through bridge member 432, contact 412, wire 411, and through contacts 404 and 405 and wire 414 to main line conductor L2. Such momentary energization of solenoid coil 424 of relay K causes the bridge member 422 of coil 424 to move out of electrical engagement with contacts 421 and 423, and into electrical engagement with a pair of contacts 451 and 452 of relay K. Contact 451 has a wire 453 electrically connecting it to wire 368 leading to the control box, and contact 452 has a wire 454 connecting it to wire 439. Thus, energization of solenoid 424 of relay K energizes the contact ring 355 in the control box as a result of its connection with wire 368, electric current being supplied to wire 368 by wire 453, contact 451, bridge member 422, contact 452, and wires 454 and 439.

From actual experience, it has been found desirable to operate the saw head motors 216 from an independent circuit, said motors being connected in parallel in said circuit whereby when the circuit, not shown in the drawings, is closed or energized, the motors are simultaneously driven. The motor 139 which drives the feed rolls and the conveyor belt 207 may also be driven from an independent circuit, not shown in the drawings, and, in like manner, motor 64 of the edge trimmer 62 may be driven from an independent circuit. These motor circuits are preferably provided with independent control switches, not shown. The saw motors 216 and also the feed rolls and edge trimmer may be driven continually. In some instances, it may be found desirable to provide the motor 139 of the feed rolls with a reverse mechanism, so that should a piece of lumber or a board become wedged in the machine and momentarily interrupt its operation, the feed rolls may be momentarily reversed to free the wedged board and thereby permit the machine to resume its operation.

To effect automatic shifting of the saw heads into cutting positions over the machine bed, a plurality of magnetically-operated circuit-closers are provided, one such device being required for each lumber-ripping combination. As hereinbefore stated, provision is made herein for only four ripping combinations, and therefore only four circuit-closers are illustrated in the wiring diagram, Figure 24, designated by the reference characters Q1, Q2, Q3 and Q4.

To clarify the description of the operation and function of the circuit-closers, there is schematically illustrated in Figures 25 and 26, a circuit-closer comprising a tiltable member or bar, generally designated by the numeral 455, having a plurality of spring clips 456, 457, 458, 459, 461, 462, 463, 464 and 465 secured thereto, each adapted to removably support a conventional mercury switch element 466, shown provided with flexible connections 467 and 468 provided with spaced contacts 469 and 470, respectively, disposed within the usual sealed tube of each mercury switch element. The tiltable member 455 is mounted for tilting movement upon pivots 471 shown provided in a supporting member, generally designated by the numeral 472, see Figure 26. The member 455 is normally disposed at a slight angle, as illustrated in Figure 26, whereby the contacts 469 and 470 of each of the mercury switches 466 supported thereon are normally in circuit-opening positions, as will be understood by reference to Figure 26.

Means is provided for tilting the member 455 from the full line position shown in Figure 26, to the dotted circuit-closing position shown therein, and comprises a solenoid, generally designated by the numeral 473, which may be supported upon a portion of the bracket 472, as illustrated in Figure 26. The usual core or movable element 474 of solenoid 473 has its upper end pivotally connected to the member 455, whereby when the winding 475 of the solenoid 473 is energized, the member 455 is tilted to circuit-closing position, as will subsequently be described. Spring means, not shown, is provided for normally returning the member 455 to its normal circuit-opening position, shown in full lines in Figure 26.

The flexible connections 468 of the mercury switches 466 are electrically connected to a contact bar 476 by suitable screws 477. The contact bar 476 is shown mounted upon and secured to an elongated supporting member 478 of insulating material which, in turn, may be secured to the supporting bracket 472, as illustrated in Figure 26. The flexible connections 467 of the mercury switches are adapted to be electrically connected to a plurality of contact clips 481, 482, 483, 484, 485, 486, 487, 488 and 489, which may be permanently secured to a supporting bar 491 of insulating material, similar to bar 478, which is also shown mounted upon and secured to the supporting bracket 472.

A wire 492 electrically connects the contact bar 476 of circuit closure Q1 to the main line conductor L1, as illustrated in Figures 24 and 25. By reference to Figure 24 it will be noted that contact bars 476 of circuit-closers Q2, Q3 and Q4 are similarly connected to the main line circuit as a result of wires 493 connecting them to wire 492.

From the foregoing, it will be noted that the mercury switches 466, all of which are identical in construction, are removably supported in their respective clips 456 to 465, inclusive, and control the flow of current from the contact bars 476 of circuit-closers Q1, Q2, Q3 and Q4 to the solenoids 279 which actuate the air valves 275 of the saw heads, as will be understood by reference to Figures 4 and 24. By referring to Figures 23, 24 and 25, it will be noted that wire 378 of position 1 on the control box is connected to one end of a contact clip 494 secured to the insulated supporting member 478 of contact bar 476 of circuit-closer Q1. The opposite end of contact clip 494 has the flexible connection 495 of a mercury switch 496 electrically secured thereto, and the other flexible connection 497 of said mercury switch is connected to one end of a contact clip 489.

A wire 499 electrically connects contact clip 489 of circuit-closer Q1 to the corresponding contact clips 489 of circuit-closers Q2, Q3, and Q4, and terminals 501 and 502 of solenoid 473 are electrically connected to wires 378 and 447, respectively, as best shown in Figure 24. Terminals 501 of solenoids 473 of circuit-closers Q2, Q3 and Q4 are connected, respectively, to wires 379, 381 and 382, and the other terminals 502 of said solenoids are electrically connected to a wire 447 by a wire 503, as clearly illustrated in Figure 24. It will thus be noted that the solenoids 473 of circuit-closers Q1, Q2, Q3 and Q4 are adapted to be energized selectively by manipulation of the control lever 343, in accordance with the particular lumber-ripping combination desired.

To clarify the description of the electrical connections between circuit-closers Q1, Q2, Q3 and Q4, and saw heads M1, M2, M3 and M4, the four contact clips 481, 482, 483 and 484 at the lefthand end of each circuit-closer, when viewed as shown in Figures 24 and 25, are identified by the reference characters m1, m2, m3 and m4, respectively, corresponding to the reference characters of the four saw heads. These four contact clips are electrically connected to the valve operating solenoids 279 of the saw heads in the following manner:

As best shown in Figure 24, wires 504, 505, 506 and 507 electrically connect the m1, m2, m3 and m4 contact clips of circuit-closer Q1, to terminals 283 of the valve solenoids 279 of saw heads M1, M2, M3 and M4, respectively, and a wire 508 electrically connects terminals 282 of said solenoids to the main line conductor L2. It will also be noted that the corresponding contact clips m1, m2, m3 and m4 of circuit-closers Q2, Q3 and Q4 are connected in parallel with contact clips m1, m2, m3 and m4 of circuit-closer Q1, by wires 509, 511, 512 and 513, respectively.

The selection of stop elements to be used for each lumber-ripping combination is controlled by manual adjustment of the mercury switches 496 of the circuit-closers Q1, Q2, Q3 and Q4. For example, when it is desired to rip a board into three strips, only two saw heads are required as, for instance, M1 and M3. To obtain this combination, the mercury switches connected to contact clips m2 and m4 of circuit-closer Q1 are disconnected therefrom, whereby current is supplied only to valve solenoids 279 of saw heads M1 and M3, as will be understood by reference to Figure 24. It will also be noted that circuit-closer Q1 is connected to but one of the movable stops, namely, i, of saw head M3, and a wire 514 therefore connects the solenoid 309 of stop i to contact clip 488 of circuit-closer Q1, the mercury switches between contact clips 485, 486 and 487 and contact bar 476 having been disconnected to prevent the flow of current from the contact bar to said contact clips. Stop i is therefore operatively connected to circuit-closer Q1, and serves to limit the forward movement of saw head M3, when circuit-closer Q1 is energized. Fixed stop x limits the forward movement of saw head M1. Obviously, the widths of the strips cut from each board may be varied by utilizing different stop elements, as will be understood.

Circuit-closer Q2, as shown in Figure 24, calls for three saw heads, M1, M2 and M3, the m4 mercury switch having been removed or disconnected, as indicated in Figure 24, whereby the valve solenoid 279 of saw head M4 remains de-energized, each time the Q2 lumber-ripping combination is utilized. It will also be noted that the mercury switch between contact clip 488 and contact bar 476 has been removed, whereby only three movable stop elements are utilized, in this instance, a, e and h, which therefore have their solenoids 309 connected by wires 515, 516, and 517 to contact slips 485, 486 and 487, respectively. Circuit-closer Q2, as shown, thus provides a three-cut lumber-ripping combination resulting in each board being cut into four strips.

Circuit-closer Q3, as shown in the wiring diagram, Figure 24, is arranged to utilize all saw heads and also four different stop elements, namely c, f, i, and j. The solenoids 309 of these stop elements are therefore connected by wires 518, 519, 521 and 522 to contact clips 485, 486, 487 and 488, respectively, of circuit-closer Q3.

Circuit-closer Q4, as shown in Figure 24, like circuit-closer Q3, utilizes all saw heads, but a different combination of stop elements are utilized as, for example, b, d, g and i, and the solenoids 309 of these stop elements are therefore shown electrically connected by wires 523, 524, 525 and 526 to contact clips 485, 486, 487 and 488, respectively, of circuit-closer Q4.

To complete circuits to the solenoids 309 of the various movable stop elements required for a given number-ripping combination, and also to effect energization of the valve solenoids 279 of the particular saw heads called for in each selected lumber-ripping combination, a circuit must be established through the winding 475 of solenoid 473 of the particular circuit-closer controlling said lumber-ripping combination, as will subsequently be described.

Another feature of the invention resides in the provision of a holding circuit which serves to prevent unauthorized shifting of the saw heads during the passage of a board through the machine. In other words, the holding circuit functions to prevent the saw heads from shifting from one ripping combination to another until each board has passed through the machine, should the operator inadvertently move the control lever 343 from one position to another while the machine is in operation. The holding circuit above referred to is best shown in Figure 23, and comprises a pair of normally opened switches W1 and W2, each comprising a fixed contact 529 and a movable contact 531. The fixed contacts 529 are electrically connected to a wire 532 connected to the main line conductor L1. The movable contacts 531 are shown electrically connected together by a wire 533, and a wire 534 electrically connects contacts 531 to the contact clips 489 of circuit-closers Q1, Q2, Q3 and Q4, as hereinbefore stated, and as clearly illustrated in Figure 24.

Switches W1 and W2 are normally open, and are closed only when a board is fed through the machine. Each such switch is therefore provided with an operating device, generally designated by the numeral 535, each comprising a pivoted member 536, normally positioned in the path of each board fed into the machine, and having complemental members 537 arranged to engage the movable contacts of their respective switches and move them into electrical engagement with the fixed contacts 529 of said switches W1 and W2, to complete a circuit to wire 499, each time a board is fed into the machine. Switch W1 is located adjacent to the feed rolls 16—18 at the receiving end of the machine, as shown in Figure 5, and switch W2 is located adjacent to feed rolls 99—122 at the discharge end of the machine, as shown in Figure 6. Thus, when a board enters between feed rolls 16—18, said switch W1 is closed, and will remain closed until the tail end of the board has passed between feed rolls 16—18. Before the tail end of the board passes clear of switch W1, the leading end of the board may have engaged member 536 of switch W2, whereby said switch is closed and will maintain a circuit through solenoid 473 of circuit-closer Q1, as hereinbefore stated.

Operation

Prior to starting the novel lumber-ripping machine herein disclosed, all of the various solenoids and relays of the control mechanism are de-energized, and the air control valves 177 and 275 of the sweeper and saw heads, respectively, are positioned to cause the sweeper and saw heads to be retained in their normal inoperative positions, under air pressure, as hereinbefore stated, and as will readily be understood by reference to Figures 2, 23 and 24.

The operator then conditions the machine for operation by first making the necessary adjustments in the circuit-closers Q1, Q2, Q3 and Q4, by increasing or decreasing the number of the mercury switches contained in each circuit-closer, to provide the desired lumber-ripping combinations to be utilized for ripping the boards of a given supply of lumber. He next starts the various motors, such as the saw motors 216, the drive motor 139 for the feed rolls, and the trimmer motor 64. These motors, as hereinbefore stated, are preferably driven from independent circuits and may continue in operation independently of the operation of the control mechanism, and regardless of whether or not lumber is being fed through the machine.

When the circuit-closers Q1 to Q4, inclusive, have thus been manipulated to provide the desired lumber-ripping combinations, and the various motors have been started, the operator depresses push button D, which energizes solenoid 408 of starter switch H, which instantly effects closing of contacts 402—403 and contacts 404—405. These contacts are thereafter retained in circuit-closing positions by solenoid 408 which remains energized through wire 406, contacts 402—403, and wire 409, wires 406 and 409 being connected respectively to the main line conductors L1 and L2, as clearly illustrated in Figure 23.

Such energization of solenoid 408 of starter switch H also energizes solenoid coil 413 of relay J through wires 414, contacts 404—405, wires 415 and 416, and switch E, which is normally closed, thence through wire 419 to contact 421 and through bridge member 422, and contact 423 of relay K, thence through wire 425 to one end of solenoid coil 413 of relay J and thence through wire 426 and switches 427 to the main line conductor L1, as shown in Figures 23 and 24. All switches 427 are closed when the saw heads M1, M2, M3 and M4 are in their normal retracted positions, as shown in Figures 4 and 24.

Energization of solenoid 413 of relay J causes its bridge member 432 to move out of electrical contact with contacts 412 and 449 and into electrical engagement with contacts 433 and 434, whereby a circuit is established through solenoid F of sweeper valve 177, through wire 435, solenoid winding 187, and wires 415 and 414 to main line conductor L2. The other side of the circuit is completed through wire 436 which has one end electrically connected to contact 433 of relay J, and its opposite end to the main line conductor L1.

Initial energization of solenoid F causes actuation of valve 177, whereby air is ported into head 173 of cylinder 169, back of piston 174, and thereby causes said piston to move the sweeper forwardly across the machine bed to clear it of sawdust and other debris which may have accumulated thereon from the preceding cycle of operation. When the sweeper approaches the limit of its forward stroke, switch E is momentarily opened as a result of abutment 195 on sweeper control rod 191 engaging rod 193 and shifting the spool-like element 197 out of engagement with arm 202 of the movable contact 203 of switch E, whereby said switch is opened and thus interrupts the flow of current to solenoid 413 of relay J. This de-energizes solenoid 413 and causes its bridge member 432 to move out of electrical engagement with contacts 433 and 434 and into electrical engagement with contacts 449 and 412. Such actuation of bridge member 432 opens the circuit to solenoid F whereby said solenoid is de-energized and permits valve 177 to function and cause the sweeper to return to its normal inoperative position, shown in Figures 8 and 23.

Just before the sweeper reaches its normal retracted position, shown in Figures 9 and 23, the pivoted element 442 on the sweeper engages the movable contact 438 of switch M and momentarily moves it into circuit-closing engagement with its complemental fixed contact 437. This momentarily completes a circuit to solenoid 424 of relay K through wire 439, contacts 437 and 438, wires 368 and 445, thence through solenoid coil 424, wire 446, through the closed contacts 389 and 391 of circuit-breaker switch U, thence through wires 447 and 448, contact 449, bridge member 432, and contact 412 of solenoid coil 413 of relay J, thence through wire 411, contacts 404—405 and wire 414 to main line conductor L2.

Such energization of relay K also completes a circuit through solenoid 473 of circuit-closer Q1, as a result of its terminal 502 being connected to wire 447 and its terminal 501 to wire 378 of commutator bar 374, providing the control lever 343 of the control box 322 is in position 1, as indicated in dotted lines in Figure 23. From commutator bar 374, the current flows through brush 365, shown in Figure 18, flexible connection 367, brush 357 to contact ring 355, thence through wire 368, which completes a circuit through solenoid 473 of circuit-closer Q1 through wire 439, because of switch M being momentarily closed. This conditions the machine for receiving a board.

The operator next removes a board from the lumber storage rack 70 and places it on the supporting rollers 73 and 74 against the guide member 66, and at the same time views the board and determines the number of strips into which it should be cut. Should the board be a relatively narrow one capable of producing only three strips, the operator shifts the control lever 343 of the control box 322 to position 1, unless it has previously been so positioned from the preceding cycle, whereupon the solenoid coil of circuit-closer Q1 is energized, as hereinbefore described. The lumber or board is then fed between the feed rolls 16—18 and 17—19 at the receiving end of the machine whereupon the board engages the pivoted element 536 of switch W1 and closes said switch, whereby a holding circuit is established through solenoid 473 of circuit-closer Q1, as follows: from main line conductor L1 through wire 532, switch W1, wires 533 and 534 to wire 499, thence through the mercury switch supported in contact clip 465, through terminal 501, solenoid coil 473, terminal 502 thereof and wires 447 and 448, contact 449, bridge member 432, contact 412, wire 411, contacts 404—405 of starter switch H, and wire 414 to main line conductor L2, as will be clearly understood by reference to Figures 23 and 24. As the board passes through the machine, the operator may remove another board from the storage rack, and if it requires but two cuts or, in other words, the same ripping combination as utilized for the preceding board, the operator need not manipulate the control lever, whereby the saw heads will remain in the same cutting positions over the machine bed until the operator subsequently shifts the control lever to another ripping combination.

Should a succeeding board be relatively wider than a preceding board, requiring it to be cut into five strips, the operator then shifts the control lever to position 3, whereupon stops c, f, i and j are moved into operating positions as a result of their respective solenoids being energized through the mercury switches of circuit-closer Q3, when its solenoid 473 is energized as a result of the control lever being in electrical engagement with commutator bar 376 through wire 381. Energization of the selected stop relays 309 is effected because of their connections with the mercury switches in circuit-closer Q3 and the wire 524 connecting them to main line conductor L2.

The novel machine herein disclosed has been found extremely valuable in the operation of ripping boards of different sizes into strips of predetermined widths for use in the manufacture of window screen frames, and various other articles requiring strip lumber. The machine, as herein disclosed, utilizes a single operating lever whereby it may readily be operated by a single attendant stationed at the receiving end of the machine adjacent to the lumber-supporting rollers 73 and 74, shown in Figure 13. The boards to be ripped into relatively narrow strips are removed from the rack 70, one at a time, and placed upon the rollers 73 and 74 by the operator, who then shoves the board against the guide 66. At the same time, he carefully views the board to determine which lumber-ripping combination should be utilized to cut it into strips, such stripping of lumber depending somewhat upon the condition of each board.

For example, if a board contains one or more defective portions, the operator chooses a ripping combination which will rip the board into a plurality of strips in such manner as to salvage as much of the usable portion of the board as possible. In other words, if a board has a relatively large knot or defective spot, the operator may select a ripping combination which will rip the board longitudinally at each side of the knot or defective portion, whereby the portions or strips of the board containing the defective areas or knots may be utilized for relatively shorter strips, when the defective portions have been severed therefrom. This has been found highly desirable when utilizing lumber which may contain numerous defective portions, such as now frequently encountered because of the scarcity of A-grade lumber at the present time.

When the operator has determined the number of strips into which a given board is to be cut, he shifts the control lever 343 of the control box 322 to move its point 344 into registration with the particular ripping combination required as, for example, position 1. When the control lever is so positioned, a circuit is established through solenoid 473 of circuit-closer Q1, representing this particular lumber-ripping combination. Energization of said solenoid 473 will actuate the rocker 455 supporting the mercury switches 466, shown in Figures 25 and 26, whereby solenoid 309 of stop $i$ is energized through wires 514 and 530, and simultaneously solenoids 279 of saw heads M1 and M3 are energized through wires 504—508 and 506—508, respectively, as indicated in Figure 24. Such energization of solenoid 309 of stop $i$ causes said stop to swing into operative position with respect to the stop member 306 of saw head M3, as will be understood by reference to Figure 10. Energization of solenoids 279 of saw heads M1 and M3 causes the valves 275 of said saw heads to be actuated to direct air under pressure to cylinder heads 266 whereby the pistons 264 of cylinders 263 are moved forwardly or in a direction towards cylinder heads 266, thereby moving their respective saw heads into engagement with their respective stop elements.

In the wiring diagram Figure 24, the abutment member 306 of cylinder head M1 will engage the fixed stop $x$, and abutment member 306 of saw head M3 will engage movable stop $i$. Simultaneously, air is released from the opposite ends of cylinders 263 and from the upper ends of cylinders 241 through the flexible conduits 272, because of said conduits being connected to air conduits 276 of cylinders 263. The board delivered into the machine is trimmed along one edge by the edge trimmer 62 and thence engages the saws and is ripped into three strips which are discharged from the opposite end of the machine by the feed rolls 99—122 and 101—123, onto a suitable receiving means, not shown in the drawings.

The holding circuit shown in the wiring diagram, Figure 23, constitutes an important feature of the invention in that it makes it possible for the operator, while a board is passing through the machine, to shift the control lever 343 of the control box to another ripping combination, required for the next board, without causing any damage to the board or machine. This results because of one or both of switches W1 and W2 being maintained in circuit-closing positions by the board passing through the machine, whereby uninterrupted flow of current is maintained through the particular circuit-closer being utilized, until the cycle has been completed.

Thus, should a relatively narrow board fed into the machine require the use of only two saw heads, and the next following board be a relatively wider board requiring four saws, the operator will have ample time to switch the control lever from one combination to another while a narrow board is passing through the machine so that before the wider board is fed into the machine, the four saw heads required for ripping the wider board will shift into sawing positions, and simultaneously the selected stop elements will automatically move into operative positions relative to their respective saw heads.

It is to be understood that should the operating lever 343 accidentally be shifted from one position to another during a cycle of operation, the saw heads which may be in operative positions over the machine bed will remain in lumber-ripping positions until the ripping cycle has been completed. This results because of the holding circuit 532—533—534 which maintains the solenoid 475 energized regardless of the position of the control lever during passage of the board through the machine. The circuit-breaker U functions to interrupt the flow of current through solenoid 424 of relay K each time the control lever is shifted from one position to another thereby to condition the control circuit for the next cycle of operation, as will be understood by reference to Figure 23, wherein it will be noted that when solenoid 424 of relay K is de-energized, contacts 421 and 423 thereof are again interconnected. It is also to be understood that the sweeper 153 is operated at the close of each cycle of operation to clear the machine bed of sawdust and other debris which may accumulate thereon during each cycle.

It will also be noted that the present machine utilizes but a single control lever for shifting it from one lumber-ripping combination to another. It is to be understood, however, that, if desired, a plurality of push buttons may be provided in lieu of the control lever 343, each interconnected with a given stop element, whereby the selected stop elements may be moved into operative position relative to their respective saw heads independently of one another by manipulation of their respective control buttons by the operator.

The various electrical devices, such as the circuit-closers Q1, Q2, Q3 and Q4, may be mounted within a suitable cabinet or housing, not shown, secured to the machine frame, whereby access may readily be had to the interior thereof to permit convenient manipulation of the switch elements of the circuit-closers, when necessary, to vary the lumber-ripping combinations. The machine is very flexible in that the number of lumber-ripping combinations available for use may readily and conveniently be varied, when necessary, by simply increasing or decreasing the number of circuit-closers in direct proportion to the number of lumber-ripping combinations required for a given job. When additional circuit-closers are to be utilized, each must have a wire electrically connecting it to one of the commutator bars in the control box, and positions for such added circuit-closers must also be added to the scale 346 on the control box 322, as will be understood.

The foregoing detailed description has been given for clearness of understanding only, and no unnecessary limitations should be understood therefrom, and the appended claims should be construed as broadly as permissible in view of the prior art.

What we claim is:

1. In a machine of the class described, a table over which the boards to be ripped are fed, a plurality of saw heads mounted for horizontal and vertical movements over said table, fluid-operated means for horizontally shifting said saw heads into and out of cutting positions over the machine table, electrically operated valve means for controlling the operations of said fluid-operated means, means for limiting the forward movements of the saw heads including a plurality of movable stop elements normally supported in inoperative positions, magnetic means for moving said stop elements into operative positions relative to their respective saw heads thereby to accurately position said saw heads relative to a board fed through the machine, and a control mechanism for effecting automatic operation of said fluid-operated means and stop elements, said control mechanism including a plurality of circuit-closers having electric connections with the electrically operated valve means of the saw heads and also having electric connections with the magnetic means of said stop elements, and a control lever for selectively effecting energization of said circuit-closers, thereby to cause a selected circuit-closer to function and cause certain of said saw heads and stop elements to become operative to produce a predetermined lumber-ripping combination.

2. In a machine of the character defined in claim 1, wherein each circuit-closer comprises a group of switch elements for controlling the supply of electric current to the electrically operated valve means of the saw heads, said switch elements being readily operable to interrupt the passage of electric current therethrough from the source of power, thereby to vary the number of saw heads utilized for a given lumber-ripping combination.

3. In a machine of the character defined in claim 2, wherein each circuit-closer also comprises a plurality of switch elements having wires electrically connecting them to the magnetic operating means of said stop elements, said switch elements being readily operable to interrupt the passage of current therethrough from the source of power thereby to increase or decrease the number of stop elements for each given lumber ripping combination.

4. In a machine of the class described, a table over which the boards to be ripped are fed, a plurality of saw heads mounted for horizontal and vertical movements over said table and each comprising a rotary saw, means for driving said saws, fluid-operated means for horizontally shifting said saw heads into and out of cutting positions over the machine table, electrically operated valve means for controlling the operation of said saw shifting means, means for limiting the forward movements of the saw heads including a plurality of movable stop elements normally retained in inoperative positions, solenoids for moving said stop elements into operative positions relative to their respective saw heads, a control mechanism comprising a plurality of circuit-closers connected in parallel and each representing a predetermined lumber-ripping combination, each circuit-closer comprising a plurality of normally open switch elements for controlling the supply of electric energy to the electrically operated valve means of the saw heads and the solenoids of said stop elements, said control mechanism also comprising a plurality of electric contacts each having a wire electrically connecting it to one of said circuit-closers, a control lever electrically connected to a source of electric power, said lever being selectively movable into engagement with said contacts, thereby to cause a selected circuit-closer to function to produce a predetermined lumber-ripping combination, before a board is fed through the machine.

5. In a machine of the class described, a bed over which the boards to be ripped are fed, one at a time, a plurality of saw heads mounted for horizontal movement over the machine bed transversely thereof, pneumatic means for laterally shifting said saw heads into and out of cutting positions over the machine bed, solenoid-operated valves for controlling the operations of said pneumatic means, a stop mechanism for each saw head for limiting the forward movement thereof, each of said stop mechanisms comprising a plurality of movable stop elements normally in inoperative positions, a control mechanism comprising a plurality of circuit-closers each representing a given lumber-ripping combination, each circuit-closer comprising a tiltable support, a plurality of switch elements mounted on said tiltable support and normally in circuit-opening positions, each circuit-closer comprising a contact bar directly connected to a source of electric energy and a plurality of contact clips disposed in spaced parallel relation to said contact bar, certain of said contact clips having electrical connections with the solenoids of the control valves for the saw heads, and others being electrically connected to the solenoids of selected stop elements, said switch elements providing electrical connections between said contact clips and the contact bar and being readily detachable from said contact clips to increase or decrease the number of saw heads and stop elements required by each circuit-closer to provide a given lumber-ripping combination, and manually operable means for selectively rendering said circuit-closers operable to provide the lumber-ripping combination required for each board.

6. In a machine of the class described, a bed over which the boards to be ripped are fed one at a time, a plurality of saw heads mounted for horizontal movement over the machine bed transversely thereof, fluid-operated means for laterally shifting said saw heads into and out of cutting positions over the machine bed, solenoid-operated valves for controlling the operations of said fluid-operated means, a stop mechanism for each saw head comprising a plurality of movable stop elements normally in inoperative positions, solenoids for moving said stop elements into operative positions, a control mechanism comprising a plurality of circuit-closers each representing a given lumber-ripping combination, each circuit-closer comprising a tiltable support, a plurality of switch elements mounted on said tiltable support and normally in circuit-opening positions, each circuit-closer comprising a contact bar directly connected to a source of electrical energy and a plurality of contact clips disposed in spaced parallel relation to said contact bar, certain of said contact slips having electrical connections with the solenoids of the control valves for the saw heads and others being electrically connected to the solenoids of selected stop elements, said switch elements providing electrical connections between said contact clips and the contact bar and being readily detachable from said contact clips to increase or decrease the number of saw heads and stop elements required by each circuit-closer to provide a given lumber-ripping combination, a solenoid operatively connected to the tiltable support of each circuit-closer and normally de-energized, a control box having a plurality of contacts each having a wire electrically connecting it to one of said circuit-closers and whereby each of said contacts represents a predetermined lumber-ripping combination, a control lever on the control box having a connection with a source of electric energy and selectively movable into engagement with said contacts, and means for completing a circuit to the solenoid of a selected circuit-closer, when a board is fed into the machine, whereby said circuit-closer will function and complete circuits to selected saw heads and stop elements and cause said saw heads and stop elements to be moved into operative positions over the machine bed to provide the desired lumber-ripping combination.

7. A machine of the character defined in claim 6, wherein a holding circuit is provided for maintaining the solenoid of the selected circuit-closer energized until the lumber-ripping operation controlled thereby has been completed, said holding circuit including a normally open switch element positioned to be actuated by each board fed through the machine.

8. In a machine of the class described, a bed over which the boards to be ripped are fed, one at a time, a plurality of saw heads mounted for horizontal movement over the machine bed transversely thereof, fluid-operated means for laterally shifting said saw heads into and out of cutting positions over the machine bed, solenoid-operated valves for controlling the operations of said fluid-operated means, a stop mechanism for each saw head comprising a plurality of movable stop elements normally in inoperative positions, solenoids for moving said stop elements into operative positions, a control mechanism comprising a plurality of circuit-closers each representing a given lumber-ripping combination, each circuit-closer comprising a plurality of normally open switch elements having electrical connections with the saw head valve solenoids, said circuit-closers also having means for electrically connecting them to selected stop elements and whereby each circuit-closer may be arranged to provide a given lumber-ripping combination, a control box comprising a plurality of contacts each having an electrical connection with one of said circuit-closers, a control lever electrically connected to a source of electric energy and selectively movable into engagement with said contacts to effect actuation of a selected circuit-closer, whereby said selected circuit-closer will cause actuation of the stop elements and saw heads electrically connected thereto, whereby when a board is fed into the machine, it will be longitudinally ripped into a predetermined number of strips.

9. A machine of the character defined in claim 8, wherein a pair of feed rolls is provided at each end of the machine bed for positively feeding each board through the machine, and electrically operated means operatively associated with said feed rolls and the selected circuit-closer, and responsive to movement of a board through the machine to prevent interruption of said circuit-closer during the board-ripping operation.

10. A machine of the character defined in claim 8, wherein a fluid-operated sweeper is provided for clearing the machine bed of sawdust and other foreign matter following each board-ripping operation, the fluid-operated means of said sweeper including a magnetically operated valve which is electrically connected in the control mechanism thereby to cause said sweeper to function automatically.

11. A machine of the character defined in claim 10, wherein an endless conveyor is provided for receiving the foreign matter removed from the machine bed by the sweeper.

12. A machine of the character defined in claim 10, wherein a normally open control switch is provided in the circuit for supplying electric energy to the control lever, which switch is adapted to be momentarily closed by the return movement of the sweeper, thereby to condition the control mechanism for the next cycle of operation.

13. In a machine of the class described, a bed over which the lumber is longitudinally fed, a pair of feed rolls at each end of the machine bed for feeding lumber through the machine, a plurality of saw heads mounted for horizontal and vertical movements over the machine bed and normally in inoperative positions, means for moving said saw heads into and out of cutting positions over the machine bed, a control mechanism for selectively controlling the operations of the saw heads, said control mechanism including a holding circuit comprising a pair of normally open switches, one positioned adjacent the feed rolls at each end of the machine, each of said switches comprising a movable element positioned in the path of the boards fed through the machine whereby when one or both of said switches are closed by the movement of a board through the machine, the operation of the machine will continue uninterruptedly until the board has passed completely through the machine and out of engagement with said switches.

14. In a machine for longitudinally ripping lumber, a table over which the boards to be ripped are successively fed in a lengthwise direction, one at a time, a plurality of sawheads mounted for horizontal and vertical movements over the machine table and normally positioned at one side of the travel path of the boards, each sawhead comprising a circular saw having an independent drive, means for horizontally shifting selected sawheads into board ripping positions over the travel path of the boards, other means for vertically actuating the selected sawheads to move their respective saws into cutting engagement with each board fed through the machine, an electric control mechanism for the sawhead shifting means, including a normally open control switch having an operating member normally positioned in the path of each board, and manually operable means for partially completing a circuit to said normally open switch and said sawhead shifting means, whereby as the boards are successively fed through the machine, each board will engage and close said normally open switch and thereby cause said control mechanism to function and automatically quickly shift the selected sawheads into cutting positions over the table and into cutting engagement with the board passing over said table.

15. In a machine of the character defined in claim 14, wherein means is provided for clearing the machine table of sawdust and other debris at the termination of each cutting operation.

16. In a machine of the character defined in claim 14, wherein the control mechanism includes a control box having a single manually operable control member pivotally mounted therein for controlling the operation of the saw head shifting means.

17. In a machine for longitudinally ripping lumber, a table over which the boards to be ripped are successively fed in a longitudinal direction, a plurality of power-driven circular saws mounted for horizontal and vertical movements and normally positioned at an elevation above said table and at one side of the travel path of the boards thereover, fluid-operated means for laterally shifting selected saws into and out of cutting positions over the machine table, a plurality of automatically movable stops for arresting the horizontal movement of said saws into cutting positions over the table in accordance with the number and widths of the strips to be cut from each board, an electric control mechanism for said saw-shifting means and said stop elements, including a selector member adapted to be pre-set in accordance with the number and widths of the strips into which each board is to be cut, and means positioned to be engaged by each board fed through the machine to render said control mechanism operable to effect instant automatic shifting of said saws into cutting positions relative to each board fed through the machine, and to effect uninterrupted operation of the machine during each cycle of operation.

18. In a machine of the character defined in claim 17, wherein pneumatic means is provided for automatically horizontally shifting the saws from one position to another over the machine table, and for vertically moving them into or out of cutting engagement with a board passing therethrough.

19. In a machine of the character defined in claim 17, wherein a sweeper passes laterally over the surface of the table at the termination of each cutting operation, thereby to clear the machine table of sawdust and other foreign matter.

20. In a machine of the character defined in claim 17, wherein pneumatic means is provided for automatically shifting the saws into and out of cutting positions over the machine table, and wherein electrically operated valve means is provided for controlling the operation of said pneumatic means.

21. In a machine of the character defined in claim 17, wherein an edge trimmer is positioned adjacent to the path of travel of the boards for trimming and squaring one edge of each board as it is fed into the machine.

22. In a machine of the character defined in claim 17, wherein electrical means is provided for automatically preventing lateral shifting of the saws while a board is passing through the machine.

23. In a machine for longitudinally ripping lumber, an elongated table over which the boards to be ripped are fed one at a time, in a lengthwise direction, a plurality of saw heads mounted for horizontal and vertical movements over said table, each sawhead comprising a circular saw having an independent motor, means for horizontally shifting selected sawheads into selected board ripping positions over said table, other means for vertically actuating the selected sawheads to lower their respective saws into lumber cutting positions adjacent to the top surface of the table, whereby a board fed through the machine will be longitudinally ripped into a predetermined number of strips by said selected saws, an electric control mechanism for the sawhead shifting means including an electrically operated device for each sawhead, said electrically operated devices being operatively connected to their respective sawhead shifting means and normally being de-energized, manually operable means for partially completing a circuit to the electrically operated devices of the saws selected for the next ripping operation, and means positioned to be actuated by each board fed into the machine, thereby to complete the circuit to the electrically operated devices of said selected sawheads, whereby said devices are operated to simultaneously shift the selected sawheads into board ripping positions relative to the table.

References Cited in the file of this patent

UNITED STATES PATENTS

| | | |
|---|---|---|
| 1,894,415 | Onstad | Jan. 17, 1933 |
| 1,977,971 | Payzant et al. | Oct. 23, 1934 |
| 2,332,654 | Mead et al. | Oct. 26, 1943 |
| 2,507,644 | Peters | May 16, 1950 |
| 2,616,501 | Smith | Nov. 4, 1952 |
| 2,652,864 | De Anguera | Sept. 22, 1953 |